United States Patent
Ricknäs et al.

(10) Patent No.: US 11,592,898 B2
(45) Date of Patent: *Feb. 28, 2023

(54) PROTECTION OF AND ACCESS TO DATA ON COMPUTING DEVICES

(71) Applicant: Tobii AB, Danderyd (SE)

(72) Inventors: Daniel Ricknäs, Danderyd (SE); Erland George-Svahn, Danderyd (SE); Rebecka Lannsjö, Danderyd (SE); Regimantas Vegele, Danderyd (SE); Andrew Ratcliff, Danderyd (SE); Guido Hermans, Danderyd (SE); Mattias Hanqvist, Danderyd (SE); Simon Hugosson, Danderyd (SE); Dmitrios Koufos, Danderyd (SE); Morgan Viktorsson, Danderyd (SE); Jonas Alexanderson, Danderyd (SE); Siavash Moghaddam, Danderyd (SE); Jimmy Carlsten, Danderyd (SE); Martin Chrzan, Danderyd (SE)

(73) Assignee: Tobii AB, Danderyd (SE)

(*) Notice: Subject to any disclaimer, the term of this patent is extended or adjusted under 35 U.S.C. 154(b) by 477 days.

This patent is subject to a terminal disclaimer.

(21) Appl. No.: 16/186,195

(22) Filed: Nov. 9, 2018

(65) Prior Publication Data
US 2019/0138738 A1    May 9, 2019

Related U.S. Application Data

(60) Provisional application No. 62/583,666, filed on Nov. 9, 2017.

(51) Int. Cl.
*H04N 7/18*      (2006.01)
*G06F 3/01*      (2006.01)
(Continued)

(52) U.S. Cl.
CPC .......... *G06F 3/013* (2013.01); *G02F 1/1393* (2013.01); *G02F 1/29* (2013.01); *G06F 3/017* (2013.01);
(Continued)

(58) Field of Classification Search
CPC .... G06F 3/013; G06F 3/0486; G06F 3/04845; G06F 21/32; G06F 3/0304; G06F 3/0485;
(Continued)

(56) References Cited

U.S. PATENT DOCUMENTS 6,204,828 B1    3/2001   Amir
7,113,170 B2    9/2006   Lauper
(Continued)

FOREIGN PATENT DOCUMENTS

EP         3483763 A1    5/2019

OTHER PUBLICATIONS

Non-Final Office Action dated Mar. 2, 2020 in related U.S. Appl. No. 16/186,205, all pgs.
(Continued)

*Primary Examiner* — Brandon Hoffman
(74) *Attorney, Agent, or Firm* — Kilpatrick Townsend & Stockton LLP

(57) ABSTRACT

Techniques for changing the presentation of information on a user interface based on presence are described. In an example, a computer system determines, based on an image sensor associated with the system, a first presence of a first user relative to a computing device. The computer system also determines an identifier of the first user. The identifier is associated with operating the computing device. The operating comprises a presentation of the user interface by the computing device. The computer system also determines, based on the image sensor, a second presence of a second person relative to the computing device. The com-
(Continued)

puter system causes an update to the user interface based on the second presence.

20 Claims, 18 Drawing Sheets

(51) Int. Cl.
| | |
|---|---|
| G06F 3/0483 | (2013.01) |
| G06F 3/0482 | (2013.01) |
| G06F 3/0486 | (2013.01) |
| G06F 3/04845 | (2022.01) |
| G06F 21/32 | (2013.01) |
| G06F 3/03 | (2006.01) |
| G06F 3/0485 | (2022.01) |
| G06F 3/04842 | (2022.01) |
| G06F 21/62 | (2013.01) |
| G02F 1/139 | (2006.01) |
| G02F 1/29 | (2006.01) |
| G06V 40/16 | (2022.01) |
| G06F 21/60 | (2013.01) |
| G06K 9/62 | (2022.01) |
| H04L 9/08 | (2006.01) |
| H04L 9/40 | (2022.01) |
| H04L 67/06 | (2022.01) |
| G06F 9/451 | (2018.01) |
| G06F 3/0484 | (2022.01) |
| G02B 27/01 | (2006.01) |
| G06T 7/50 | (2017.01) |
| G06F 3/04817 | (2022.01) |
| G09G 5/37 | (2006.01) |

(52) U.S. Cl.
CPC .......... *G06F 3/0304* (2013.01); *G06F 3/0482* (2013.01); *G06F 3/0483* (2013.01); *G06F 3/0484* (2013.01); *G06F 3/0485* (2013.01); *G06F 3/0486* (2013.01); *G06F 3/04842* (2013.01); *G06F 3/04845* (2013.01); *G06F 9/451* (2018.02); *G06F 21/32* (2013.01); *G06F 21/604* (2013.01); *G06F 21/606* (2013.01); *G06F 21/62* (2013.01); *G06F 21/629* (2013.01); *G06F 21/6218* (2013.01); *G06K 9/6201* (2013.01); *G06V 40/161* (2022.01); *H04L 9/0866* (2013.01); *H04L 63/0428* (2013.01); *H04L 67/06* (2013.01); *G02B 2027/0178* (2013.01); *G02F 1/294* (2021.01); *G02F 2203/05* (2013.01); *G02F 2203/07* (2013.01); *G06F 3/04817* (2013.01); *G06F 21/6245* (2013.01); *G06F 2203/04806* (2013.01); *G06F 2221/2139* (2013.01); *G06F 2221/2149* (2013.01); *G06T 7/50* (2017.01); *G06V 40/172* (2022.01); *G09G 5/37* (2013.01); *G09G 2320/0261* (2013.01); *G09G 2320/0626* (2013.01); *G09G 2354/00* (2013.01); *G09G 2358/00* (2013.01)

(58) Field of Classification Search
CPC ............ G06F 3/04842; G06F 21/6218; G06F 21/606; G06F 21/62; G06F 9/451; G06F 3/0484; G06F 21/604; G06F 21/629; G06F 3/0483; G06F 3/0482; G06F 3/017; G06F 2221/2139; G06F 2221/2149; G06F 21/6245; G06F 3/04817; G06F 2203/04806; G02F 1/1393; G02F 1/29; G02F 2001/294; G02F 2203/05; G02F 2203/07; G06K 9/6201; G06K 9/00228; G06K 9/00288; H04L 9/0866; H04L 63/0428; H04L 67/06; G02B 2027/0178; G09G 2320/0261; G09G 5/37; G09G 2320/0626; G09G 2354/00; G09G 2358/00; G06T 7/50
USPC .......................................................... 726/28
See application file for complete search history.

(56) References Cited

U.S. PATENT DOCUMENTS

| | | | |
|---|---|---|---|
| 9,251,242 B2 | 2/2016 | Kamiya | |
| 9,405,918 B2* | 8/2016 | Freed | G06F 21/10 |
| 9,619,020 B2 | 4/2017 | George-Svahn | |
| 9,898,901 B1* | 2/2018 | Kurian | H04W 12/033 |
| 2008/0163368 A1* | 7/2008 | Harris | G06F 21/84 |
| | | | 726/21 |
| 2008/0177994 A1 | 7/2008 | Mayer | |
| 2011/0296308 A1* | 12/2011 | Yi | G06F 21/52 |
| | | | 715/733 |
| 2013/0025647 A1* | 1/2013 | Bouten | B32B 27/40 |
| | | | 136/244 |
| 2013/0169560 A1 | 7/2013 | Cederlund | |
| 2014/0025697 A1 | 1/2014 | Kamiya | |
| 2014/0201844 A1* | 7/2014 | Buck | G06F 21/554 |
| | | | 726/26 |
| 2014/0247232 A1* | 9/2014 | George-Svahn | G06F 3/012 |
| | | | 345/173 |
| 2015/0170446 A1* | 6/2015 | Burba | G07C 9/32 |
| | | | 340/5.52 |
| 2016/0124505 A1* | 5/2016 | Liu | G06F 3/0483 |
| | | | 345/156 |
| 2016/0188143 A1 | 6/2016 | Kohlmeier et al. | |
| 2016/0188973 A1* | 6/2016 | Ziaja | G06F 3/013 |
| | | | 382/116 |
| 2017/0357444 A1 | 12/2017 | McFarland et al. | |
| 2017/0358305 A1 | 12/2017 | Kudurshian et al. | |
| 2018/0321739 A1 | 11/2018 | Park | |
| 2019/0065790 A1* | 2/2019 | Jones | G09G 5/00 |
| 2019/0121654 A1 | 4/2019 | Tsuchiya et al. | |
| 2019/0138093 A1 | 5/2019 | Ricknäs | |
| 2019/0138738 A1 | 5/2019 | Ricknäs | |
| 2019/0138740 A1 | 5/2019 | Ricknäs | |

OTHER PUBLICATIONS

Non-Final Office Action dated Jul. 27, 2020 in related U.S. Appl. No. 16/186,201, all pgs.

* cited by examiner

PROTECTION OF AND ACCESS TO DATA ON COMPUTING DEVICES

CROSS REFERENCE TO RELATED APPLICATIONS

This application claims the benefit of, and priority to Provisional U.S. Patent Application No. 62/583,666 filed Nov. 9, 2017, the entire disclosure of which is hereby incorporated by reference, for all purposes, as if fully set forth herein.

BACKGROUND

User experience on computing devices vary widely depending on a number of factors including the capabilities of the computing devices and the hosted applications. Protecting data and providing access thereto are relevant aspects of the user experience. If the data is compromised, the user experience can be significantly degraded. Similarly, if multiple steps are needed to access the data, the user experience can also be negatively impacted. Existing systems attempt to address these two aspects in different ways.

In an example, data on a computing device can be sensitive, private, or confidential to a user. Therefore, protecting it from unauthorized access, such as by persons not permitted by the user, becomes important. When the user walks away from the computing device, the unauthorized access can be prevented by locking the display. The locking can be manual based on user input or can be automatic upon an elapse of an inactivity time period. The unlocking usually necessitates login information of the user.

However, this protection process has some drawbacks. In particular, if the user forgets to manually lock the computing device, an unauthorized person can access the data before the elapse of the inactivity time period. Further, even if properly locked, this process does not protect against the unauthorized peeking over the display to get visual access to the data while the user is operating the computing device.

To protect against the peeking, existing solutions involve using a hardware display filter. Such a filer is typically attached to the display, permanently or temporarily. However, the filter tends to dim the brightness of the display at all times when attached, even when there is no unauthorized peeking and, thus, degrade the user experience.

The user experience associated with the authorized access (e.g., the access of the user) is generally improved by providing different shortcuts to manipulate the data. For example, by pressing a combination of buttons on a keyboard, the data can be copied and pasted between locations on the computing device. Similarly, by pressing another combination of buttons, the user can switch between open windows in the background and foreground of the display. However, such shortcuts typically necessitate the user to be familiar with the combinations and typically rely on tactile input.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
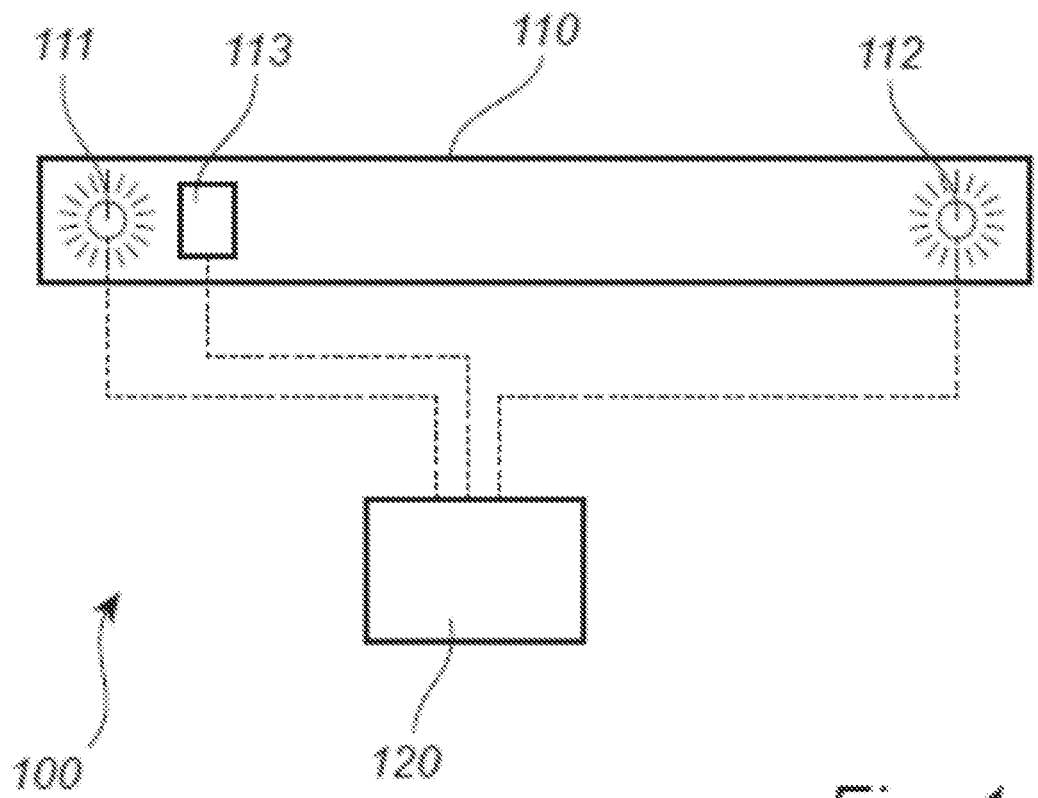
FIG. 1 shows an eye tacking system, according to an embodiment.

Embodiments of the present disclosure are directed to, among other things, using eye tracking technology to improve the user experience, including improvements to data protection and data access. Advances in eye tracking technology have made it possible to interact with a computing device using a person's gaze information. In other words, the location on a display the user is gazing at. This information can be used for interaction solely, or in combination with a contact-based interaction technique (e.g., using a user input device, such as a keyboard, a mouse, or a touch screen). Previously proposed interaction techniques using gaze information can be found in U.S. Pat. No. 6,204,828, United States Patent Application 20130169560, U.S. Pat. No. 7,113,170, United States Patent Application 20140247232, and U.S. Pat. No. 9,619,020. The full specification of these patents and applications are herein incorporated by reference.

Relevant to data protection, embodiments of the present disclosure involve detecting a presence of an authorized user relative to a computing device and updating a user interface of the computing device based on this presence and, optionally, the presence of another person(s) relative to the computing device. For example, upon the user logging onto the computing device, an image sensor is activated and monitors whether the user remains present or not. If the user leaves, the user interface is automatically and immediately locked. In this way, the data on the computing device can be automatically and immediately protected in the user's absence. In another example, while the user is operating the computing device and his or her presence is sensed, if the presence of another person is sensed too and indicates that this other person is gazing on the user interface, the computing device can automatically dim the brightness of the user interface while the unauthorized gaze is detected. In this way, the data is protected against unauthorized peeking without the complexity and impact to the user experience of installing and using hardware display filters. In a way, the control over the brightness acts as a display filter implemented in software and automatically activated and deactivated during the necessary time period.

Relevant to data access, embodiments of the present disclosure involve using gaze information to control how data is manipulated and/or presented on the user interface. In an example, the user may have multiple open windows on the user interface. Some of the windows may be in the background and other ones may be in the foreground of the user interface. Generally, a foreground window occludes the presentation of a background window. Based on detecting a gaze of a user on the foreground window, a viewer can be presented over this window and the viewer can show content of the hidden background window. In this way, the viewer acts as a peephole giving insights about the background window without necessitating the user to switch over that widow (e.g., by pressing a combination of buttons to switch the window from the background to the foreground).

In another example, gaze information is used to copy data. For instance, the user may desire to copy a number of files from a source folder presented in the foreground to a destination folder available in the background. The user presses a combination of keys to select and copy the files. Based on the gaze information, a user interface (UI) object is presented on the user interface. The UI object tracks the user's gaze and shows the number of copied files. The user can expand the UI object by pressing a button, such that the UI object presents details about the copied files (e.g., file name, source location, etc.). Upon the user gazing over the destination folder and providing another user input (e.g. by pressing a combination of buttons), the files are copied to the destination folder and the UI object is updated to show the progress of the copying. In this way, the gaze information is used to move data between folders without necessitating the user to switch between the folders (e.g., by pressing a combination of buttons to switch the destination folder from the background to the foreground of the user interface).

These and other features are provided for illustrative purposes. The data protection and data access are further described in connection with FIGS. 4-19. Beforehand, details of a gaze tracking system are described in FIGS. 1-3.

Eye Tracking

FIG. 1 shows an eye tacking system 100 (which may also be referred to as a gaze tracking system), according to an embodiment. The system 100 comprises illuminators 111 and 112 for illuminating the eyes of a user, and a image sensor 113 for capturing images of the eyes of the user. The illuminators 111 and 112 may for example be light emitting diodes emitting light in the infrared frequency band, or in the near infrared frequency band. The image sensor 113 may for example be a camera, such as a complementary metal oxide semiconductor (CMOS) camera or a charged coupled device (CCD) camera. The camera is not limited IR camera or depth camera or light-field camera. And the shutter mechanism of the image sensor can either be rolling shutter or global shutter.

A first illuminator 111 is arranged coaxially with (or close to) the image sensor 113 so that the image sensor 113 may capture bright pupil images of the user's eyes. Due to the coaxial arrangement of the first illuminator 111 and the image sensor 113, light reflected from the retina of an eye returns back out through the pupil towards the image sensor 113, so that the pupil appears brighter than the iris surrounding it in images where the first illuminator 111 illuminates the eye. A second illuminator 112 is arranged non-coaxially with (or further away from) the image sensor 113 for capturing dark pupil images. Due to the non-coaxial arrangement of the second illuminator 112 and the image sensor 113, light reflected from the retina of an eye does not reach the image sensor 113 and the pupil appears darker than the iris surrounding it in images where the second illuminator 112 illuminates the eye. The illuminators 111 and 112 may for example take turns to illuminate the eye, so that every second image is a bright pupil image, and every second image is a dark pupil image.

The eye tracking system 100 also comprises circuitry 120 (for example including one or more processors) for processing the images captured by the image sensor 113. The circuitry 120 may for example be connected to the image sensor 113 and the illuminators 111 and 112 via a wired or a wireless connection. In another example, circuitry 120 in the form of one or more processors may be provided in one or more stacked layers below the light sensitive surface of the image sensor 113.

Figure 2:
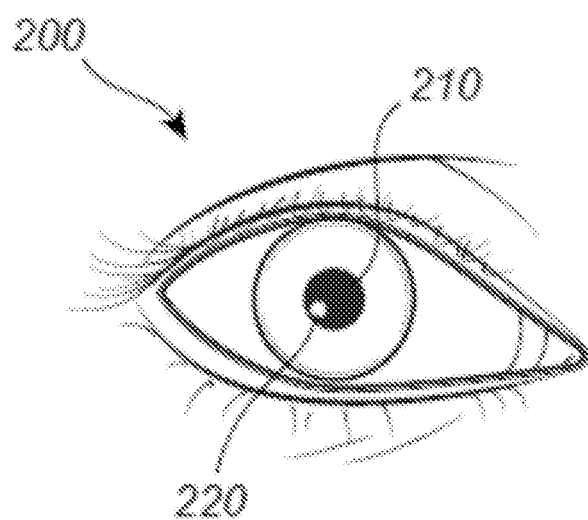
FIG. 2 shows an example of an image of an eye captured by an image sensor, according to an embodiment.

FIG. 2 shows an example of an image of an eye 200 captured by the image sensor 113, according to an embodiment. The circuitry 120 may for example employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and image sensors may be employed for eye tracking, and that such illuminators and image sensors may be distributed in many different ways relative to displays watched by the user. It will be appreciated that the eye tracking scheme described in the present disclosure may for example be employed for remote eye tracking (for example in a personal computer, a smart phone, or integrated in a vehicle) or for wearable eye tracking (such as in virtual reality glasses or augmented reality glasses).

Figure 3:
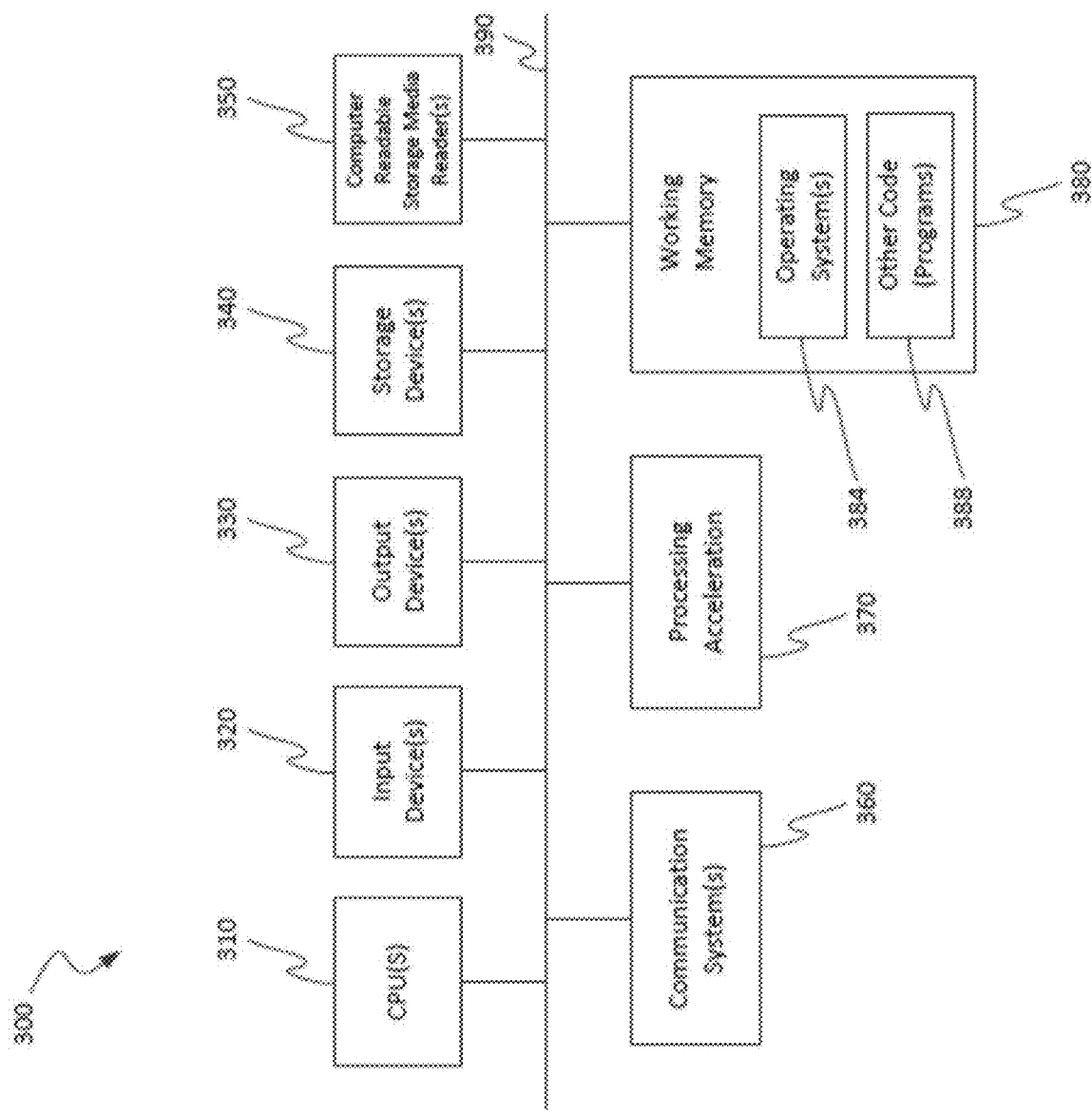
FIG. 3 is a block diagram illustrating a specialized computer system in which embodiments of the present disclosure may be implemented.

FIG. 3 is a block diagram illustrating a specialized computer system 300 in which embodiments of the present disclosure may be implemented. This example illustrates specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Data Protection

Figure 4:
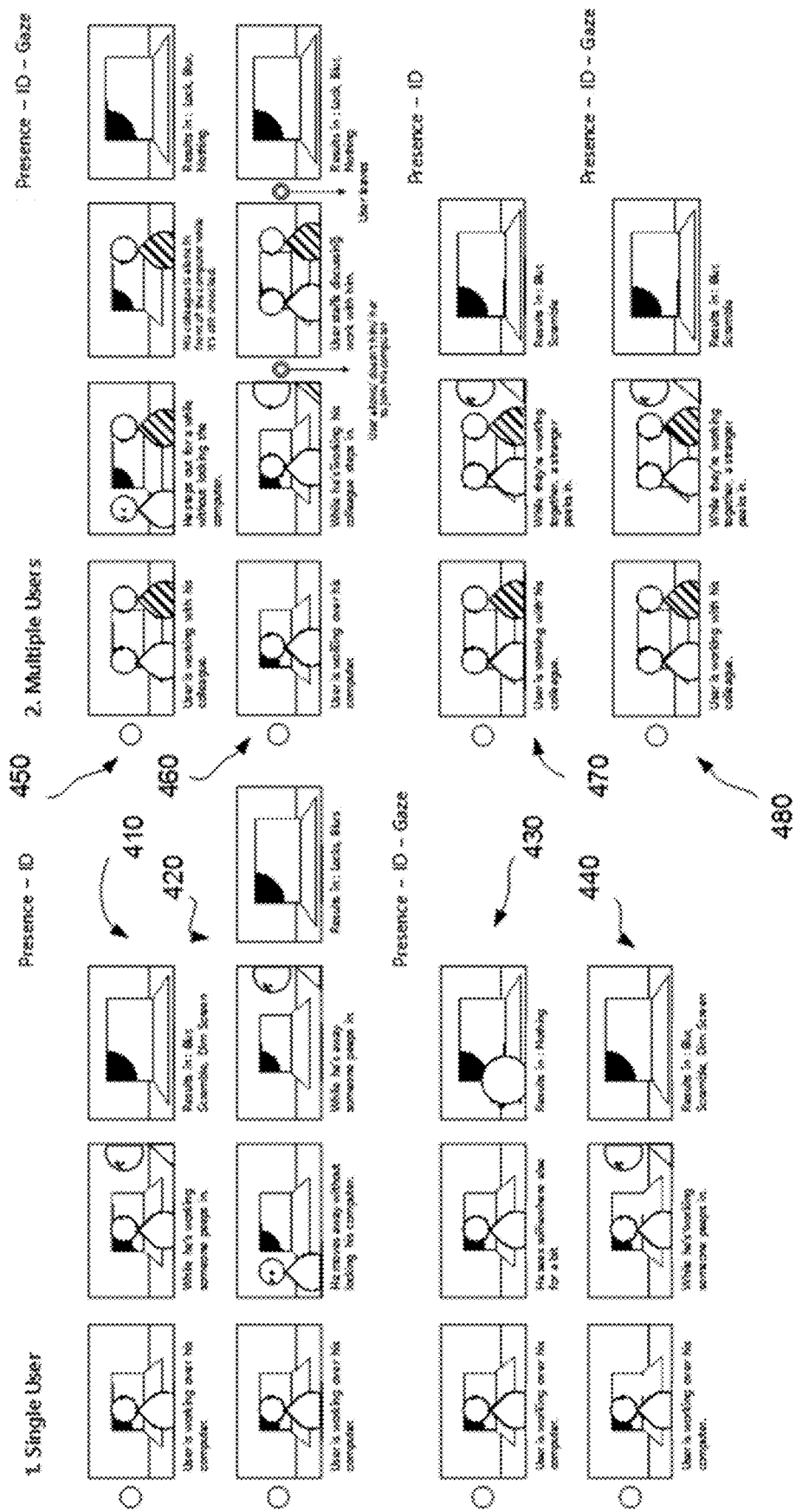
FIG. 4 illustrates examples for protecting data on a computing device of a user based on presence detection, according to an embodiment.

FIG. 4 illustrates examples for protecting data on a computing device of a user based on presence detection, according to an embodiment. Various scenarios are illustrated including the presence of a single user and multiple users, and including the use of gaze information.

In one scenario 410, a single user operates a computing device and the presence of a second person is detected. The user is identified as an authorized user of the computing device. various techniques are possible for this identification. For example, the user provider a user identifier (e.g. a username, a credential, etc.) to log onto the computing device. The user identifier is used to validate the user's access. In another example, an image sensor captures an image of the user. Facial recognition is applied to compare the image with known images of an unauthorized user(s). An image match based on the comparison validates the user's access. In this example, the image sensor can be integrated with the computing device separately from an eye tracking system or, alternatively, can be an image sensor of the eye tracking system. In turn, the eye tracking system can be integrated or communicatively coupled with the computing device.

The presence of the user relative to the computing device is monitored over time. This monitoring can occur over repeated time intervals (e.g., every one second or some other time interval defined as a default or specified in a user setting). In an example, the presence is detected based on images captured by the image sensor. For instance, if an analysis of an image shows the user (e.g., the user's face is detected based on facial recognition), a determination is made that the user is present. As used herein the user's "presence relative to the computing device" refers to the user being in proximity of the computing device (e.g., working on the computing device by sitting in front of it or being an area adjacent to the computing device), where the proximity depends on the capability of detecting the user from an image captured by the image sensor.

While the user is presence relative to the computing device (e.g., working on it), the presence of a second person is detected. Here, the presence of the second person can be similarly detected based on images captured from the image sensor. For instance, if an image shows the second person (in addition to the user), a determination is made that the second person is present. As used herein the person's "presence relative to the computing device" refers to the person being in proximity of the computing device (e.g., being an area adjacent to the computing device), where the proximity depends on the capability of detecting the person from an image captured by the image sensor. A distinction is made between a "user" and a "person." While a "user" is an individual, the user is an authorized operator of the computing device. In comparison, a "person" is also an individual, but this individual is not an operator of the computing device.

Once the other person is detected, a determination may be made as to whether this person is authorized to be in proximity of the computing device or not (e.g., a second authorized user). Various techniques are possible to make this determination. In one example, an identifier of the person can be used. For instance, if the person properly logs in to the computing device, the determination is that he or she is authorized. Here the login can be with credentials of the person or based on facial recognition as described herein above. In another example, a user setting is used. For instance, the user setting can specify the number of persons allowed to be in proximity of the computing device, in addition to the user, and/or may store images of such persons. The images, if available, would be used for facial recognition to authorize the presence of the person. In yet another example, the timing of the detected presence of the person is used in the determination. More specifically, if the user was first present, and then subsequently, the person became present, this presence of the person is presumed to be unauthorized.

If the presence of the person is determined to be unauthorized (e.g., not permitted by the user of the computing device), the user interface of the computing device can be automatically updated. For example, the user interface can be blurred and/or content presented in the user interface can be scrambled. These and other updates are possible and can be defined in a user setting. Alternatively, the user setting may specify that no updates should be made based on the unauthorized presence of the person.

In another scenario 420, a single user operates a computing device, moves away without locking the computing device, and the presence of a second person is detected while the user is absent. Based on the user being absent and the presence of the other person being detected, the user interface of the computing device is automatically updated. Here, the update includes, for instance, locking and/or blurring the user interface. Of course, other updates are possible and can be defined in a user setting.

Here also, similarly to the scenario 410, the user's presence relative to the computing device and the determination that he or she is an authorized user of the computing device can involve images captured by the image sensor and an identifier of the user. Likewise, the unauthorized presence of the second person can involve the images.

Various techniques are possible to detect the absence of the user. In one example, if one or more images captured by the image sensor no longer show the user, a determination is made that the user became absent. In another example, the user's activity on the computing device is tracked (e.g., the frequency of button presses on the device's keyboard). If the activity stops (e.g., buttons are no longer pressed at all, or at least at a minimum frequency rate), the user's absence is detected.

In another scenario 430, a single user operates a computing device and, for some time, looks away from the computing device. Based on the user being present relative to the computing device, the user interface is not updated (e.g., dimmed) even if the user looks away. In comparison, existing systems (e.g., existing smart phones) would dim the user interface when the user looks away.

Here also, similarly to the scenario 410, the user's presence relative to the computing device and the determination that he or she is an authorized user of the computing device can involve images captured by the image sensor and an identifier of the user. In addition, the user's presence and/or his or her absence can be detected based on gaze information. Specifically, the gaze tracking system can monitor the position of the user's gaze on the user interface. As long as the gaze is detected, a determination is made that the user is present. If the gaze is no longer sensed, a determination is made that the user looked away.

In another scenario 440, a single user operates a computing device and the presence of a second person is detected while the user is present. The presence of this person indicates that the person is peeping on the user interface. Based on the simultaneous presences of the user and the other person, the user interface of the computing device is automatically updated. Here, the update includes, for instance, locking, dimming, and/or blurring the user interface. Of course, other updates are possible and can be defined in a user setting.

Here also, similarly to the scenario 430, the user's presence relative to the computing device and the determination that he or she is an authorized user of the computing device can involve images captured by the image sensor, gaze information tracked by an eye tracking system, and an identifier of the user. The peeping of the other person is determined based on gaze information detected by the eye tracking system.

In an example, prior to updating the user interface, a determination is made whether the peeping of the other person is authorized or not. If unauthorized, the user interface is updated. Different techniques are possible to make this determination. In one example, the user's gaze is tracked over time. Upon detecting a second gaze (e.g., that of the other person), the second gaze is presumed to be unauthorized, unless otherwise specified by a user setting (e.g., the user setting authorizing multiple gazes). In another example, the user's presence (and not necessarily gaze) and activity on the computing device are tracked over time. After a period of time of the user's presence and user activity, if the gaze is detected, this gaze is presumed to be of another person and to be unauthorized. In yet another example, the distance between the person and the user interface is estimated based on the gaze information. A similar estimation can be made for the user's gaze. If the person-to-user interface distance is larger than the user-to-user interface distance, the person's gaze is determined to be unauthorized.

In yet another scenario 450, multiple users are working on a computing device. For instance, a user is working with his or her colleague and both are authorized to be present relative to the computing device. If the user is no longer present (e.g., walks away from the computing device) but the colleague remains present, the user interface is updated. For example, the user interface is locked and/or blurred. Of course, other updates are possible and can be defined in a user setting.

Similarly to the scenario 430, the user's presence relative to the computing device and the determination that he or she is an authorized user of the computing device can involve images captured by the image sensor, gaze information tracked by an eye tracking system, and an identifier of the user. The user's absence relative to the computing device can be determined from images captured by the image sensor and/or the eye tracking system, showing that the user is no longer in proximity of the computing device.

The colleague's presence relative to the computing device can involve images captured by the image sensor and/or gaze information tracked by the eye tracking system. The determination that the colleague's presence is authorized can vary depending on the presence of the user. If the user is present, the colleague's presence is determined to be authorized based on input of the user at the computing device (e.g., a keystroke) indicating the user's authorization, based on a predefined user setting (e.g., one indicating that the simultaneous presence is authorized), or based on an identifier of the colleague (e.g., a login of the colleague onto the computing device, input of the user identifying the colleague against an access control list, or facial recognition against known images of authorized colleagues). In the user is absent, the presence of the colleague is presumed to be unauthorized or the presence becomes unauthorized as soon as the colleague starts gazing at the user interface.

In a further scenario 460, a single user is working on a computing device. A colleague joins him or her and the user allows the colleague to do so. Thereafter, the user moves away from the computing device. The user interface is updated. For example, the user interface is locked and/or blurred. Of course, other updates are possible and can be defined in a user setting. In addition, if the user setting indicates that no updates are needed, the user interface can remain the same.

Here, similarly to the scenario 450, the user's presence relative to the computing device and the determination that he or she is an authorized user of the computing device can involve images captured by the image sensor, gaze information tracked by an eye tracking system, and an identifier of the user. The user's absence relative to the computing device can be determined from images captured by the image sensor and/or the eye tracking system, showing that the user is no longer in proximity of the computing device.

The colleague's presence is detected after a period of time, during which the presence of the user was detected. The colleague's detection can also involve images captured by the image sensor and/or gaze information tracked by the eye tracking system. The determination of whether the colleague's presence is authorized or not depends on explicit input of the user. For instance, after a predefined period of time (where this time period can be specified in a user setting as one minute or some other length), if the a specific keystroke or combination of keystrokes is received, the presence of the colleague is determined to be authorized. When the user moves away, the presence of the colleague can be presumed to be unauthorized unless explicit input of the user was received prior to moving away.

In another scenario 470, multiple users are working on a computing device. For instance, a user is working with his or her colleague and both are authorized to be present relative to the computing device. While both are present, if the presence of a third person is detected, the user interface can be updated. For example, the user interface is blurred or its content is scrambled. Of course, other updates are possible and can be defined in a user setting.

Here, similarly to the scenario 450, the presence and the determination that the presence is authorized for each of the user and the colleague can involve images captured by the image sensor and an identifier(s) of the user and/or colleague. Similar to the scenario 410, the presence of the third person and the determination that it is unauthorized can involve images captured by the image sensor.

In a further scenario 480, multiple users are working on a computing device. For instance, a user is working with his or her colleague and both are authorized to be present relative to the computing device. While both are present, presence of a third person is detected and that presence indicates that the person is gazing on the user interface, the user interface can be updated. For example, the user interface is blurred or its content is scrambled. Of course, other updates are possible and can be defined in a user setting.

Here, similarly to the scenario 470, the presence and the determination that the presence is authorized for each of the user and the colleague can involve images captured by the image sensor, gaze information generated by an eye tracking system, and an identifier(s) of the user and/or colleague. Similar to the scenario 440, the presence of the third person and the determination that it is unauthorized can involve images captured by the image sensor and/or gaze information generated by the eye tracking system.

Figure 5:
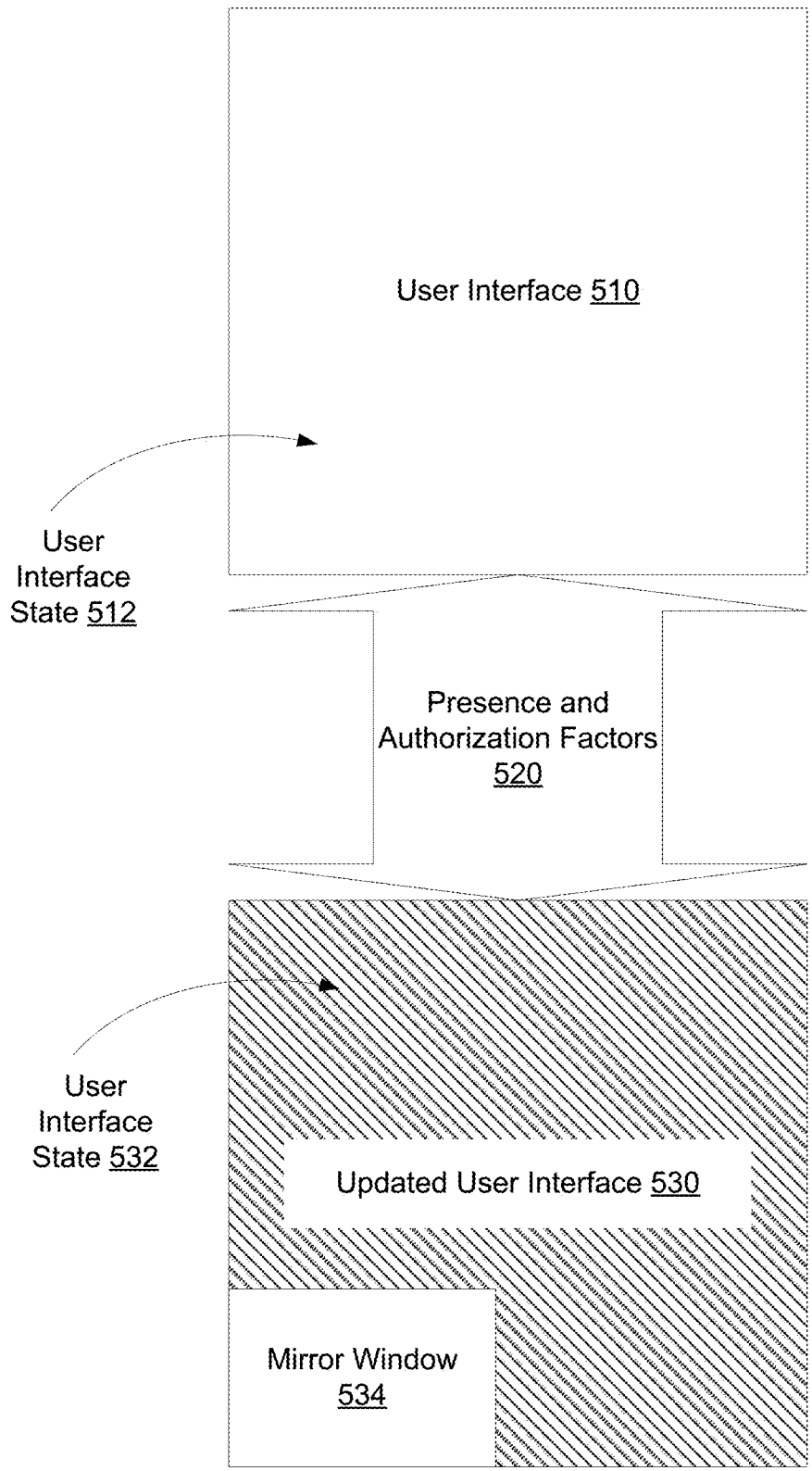
FIG. 5 illustrates an example of updating a user interface in support of data protection, according to an embodiment.

FIG. 5 illustrates an example of updating a user interface in support of data protection, according to an embodiment. Generally, in the above scenarios 410-480 of FIG. 4, a user interface 510 is updated (shown in FIG. 5 as updated user interface 530) to protect the data automatically and immediately based on a combination of factors 520: presence of a user, absence of a user, presence of a colleague, and/or presence of another person. The presence of each of such individuals can involve images captured by an image sensor and/or by an eye tracking system, in addition to or alternatively, gaze information generated by the eye tracking system. Updating the interface 510 involves changing it from a first state 512 to a second state 532. In the first state 512, data is presented on the user interface in a user friendly manner such that any individual can easily perceive the data. In the second state 532, the presentation is altered such that properly perceiving the data is made harder.

Hence, when the combination of factors 520 indicates an unauthorized presence of a colleague or another person, the user interface 510 is changed from the first state 512 to the second state 532 unless a user setting indicates otherwise. Conversely, if the combination of factors 520 indicates that, now, all presence(s) are authorized or that the colleague and/or other person are now absent, the updated user interface 530 can be changed back from the second state 532 to the first state 512. For instance and referring back to the first scenario 410 of FIG. 4, after the user interface has been blurred because the second person was detected as being present and this presence to be unauthorized, this person is no longer sensed as being present. Accordingly, the user interface is changed back to its original state. Of course similar scenarios to change back to the original state are possible in the remaining scenarios 420-480 of FIG. 4.

Different updates (e.g. second state 532) are possible including locking the user interface 510, blurring the user interface 510, scrambling content of the user interface 510, and dimming the user interface 510 (e.g., changing the brightness of a display that presents the user interface). To unlock the locked user interface 532, an identifier of the user is generally necessitated.

Other updates are also possible as described herein next. Any of these and the above updates can be selected and specified in a user setting.

In an example, the user interface 500 presents one or more windows. An unauthorized presence is detected and a distance between the unauthorized individual (e.g., a colleague or another person) and the user interface (or the display) is estimated based on images captured by an image sensor and/or an eye tracking system, and/or based on this individual's gaze information on the user interface. The update to the user interface includes zooming out one or all the windows of the user interface. The resolution of the zooming out is based on the distance. For instance, the closer the unauthorized individual is, the higher degree of zooming out is applied.

In an example, the update to the user interface 510 includes turning on one or more lights associated with a keyboard of the computing device. For instance, light emitting diodes (LEDs) underneath the buttons of the keyboard are turned on and form a pattern. The pattern is based on the distance of the unauthorized individual. The closer that individual is, the higher the number of LEDs is turned on, a more alerting color is presented (e.g., red instead of yellow), or the higher the flashing frequency of the LEDs become.

In an example, the update to the user interface 510 includes presenting an icon on the user interface 530 indicating the presence of the other individual. For example, the icon can have an eye shape to indicate that the user or the user interface 530 is being watched.

In an example, the user interface 510 presents first content having a tag and untagged content (e.g., a document labeled as private by the user and another document unlabeled). In this example, the update to the user interface 510 includes hiding the first content based on the tag and retaining the presentation of the untagged content. For instance, the content (e.g., the labeled document) is minimized while no change is made to the untagged content.

In an example, the user interface 510 presents a first window having a tag (e.g., the user tagged the window as presenting sensitive information) and an untagged window (e.g., any other open window that was not tagged). In this example, the update to the user interface 510 includes blurring the first window based on the tag and retaining the presentation of the untagged window.

In an example, the user interface 510 presents content. In this example, the update to the user interface 510 includes blurring the first window based on the tag and retaining the presentation of the untagged window scrambling the content. In this example also, if the user is detected as gazing at particular portion of the content, that portion is not scrambled and is, instead, presented in its original state. However, the remaining portion of the content (e.g., the portion not gazed upon by the user) is scrambled.

In an example, the update to the user interface 510 includes adding to the user interface 530 a window 534 associated with presenting image data of the unauthorized individual. This window 534 can be referred as a mirror window as it allows the user to see behind his or her back. The mirror window 534 can present an image of the individual. The image can be a live image or can be one retrieved from memory based on facial recognition. Alternatively, the mirror window 534 can present a live video of the individual while present in proximity of the computing device.

In an example, the user interface 510 presents one or more windows. In this example, the update to the user interface 510 includes zooming forward one or each of such windows included and fading away the window(s). Upon determining that the data no longer needs to be protected and, thus, the user interface 530 should be changed back, the user interface 530 is updated such that the change back includes zooming back and fading in the window(s).

In an example, the user is detected as being absent. While the other individual is present (and his or her presence being unauthorized), the update to the user interface 510 includes blurring the user interface 510 and adding a digital overlay over the blurred user interface 530, such as a white layer with a grain. The individual (and any other passer-by) are able to paint on this layer with their gaze. Gaze information of the individual (and passer-by) is detected and used to change the digital overlay. For example, colors and elements are added to the overlay and tracks the detected gaze. When the user comes back (the user's presence is detected again after the change to the digital overlay), user input us received and is associated with dismissing the digital overlay. Based on this user input, the user interface 530 is changed back to its original state. For instance, the user presses a key, a combination of keys, or moves the mouse to dismiss the digital overlay and un-blur the user interface 530.

Figure 6:
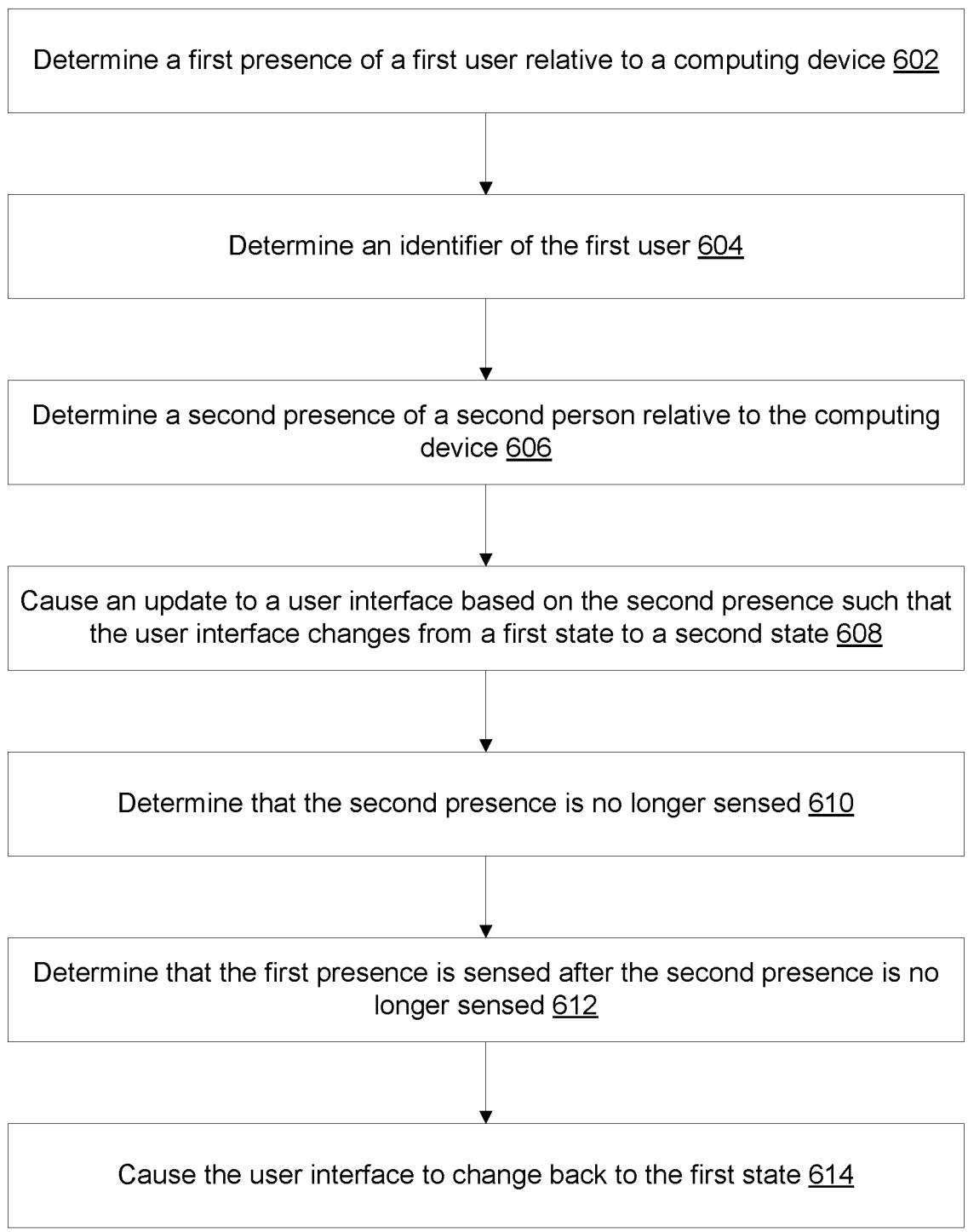
FIG. 6 illustrates an example flow for protecting data based for a single user of a computing device, according to an embodiment.

FIG. 6 illustrates an example flow for protecting data based for a single user of a computing device, according to an embodiment. The example flow starts at operation 602, where a first presence of a first user relative to a computing device is determined. In an example, the first presence is determined based on images captured by an image sensor or based on gaze information tracked by an eye tracking system. The image sensor can be a component of the eye tracking system or can be a separate component. Similarly, the eye tracking system can be a component of the computing device or can be a separate component. The first presence can be sensed by the eye tracking system and indication of the presence is provided from this system to the computing device. Additionally or alternatively, the computing device determines the presence from the captured images.

At operation 604, an identifier of the first user is determined. Different types of identifiers are possible as described in connection with FIG. 4. In an example, the first user logs into the computing device. The login information represents the identifier. In another example, facial recognition is applied to the images and the detected facial features (or a generated signature based on facial information) is used as the identifier. Generally, the identifier is used by the computing device to determine that the user is authorized to use the computing device.

At operation 606, a second presence of a second user relative to the computing device is determined. In an example, the second presence is determined similarly to the operation 602.

At operation 608, an update is caused to a user interface of the computing device based on the second presence such that the user interface changes from a first state to a second state. In an example, in addition to the second presence, a number of other factors can be used to cause this update. Generally, a determination is made as to whether the second presence is authorized or not. This determination can depend on whether the first presence of the first user is still detected while the second presence is detected or not as described in connection with scenarios 410-440 of FIG. 4. If the second presence is not authorized, the computing device changes the user interface to the second state that that properly perceiving the data presented on the user interface becomes harder or less user-friendly. Otherwise, the change may not be performed.

At operation 610, a determination is made that the second presence is no longer sensed. For example, this determination involves images captured by the image sensor and/or eye tracking system, and/or gaze information generated by the eye tracking system. If the second person is no longer in proximity of the computing device, the user interface can be changed back to its first state. In an example, this change is automatic when the second presence is no longer sensed. In another example, the change depends on other factors such as whether the first user is present while the second person is no longer present as described in operation 612.

At operation 612, a determination is made that the first presence is sensed after the second presence is no longer sensed. For example, this determination involves images captured by the image sensor and/or eye tracking system, and/or gaze information generated by the eye tracking system. This determination is used as a factor to automatically change the user interface back to the first state without additional input of the user such that the effort of the user to re-access the data is reduced.

At operation 614, the user interface is caused to change back to the first state. For example, the computing device transitions the user interface from the second state to the first state based on the second presence no longer being sensed and the first presence of the first user still being sensed.

Figure 7:
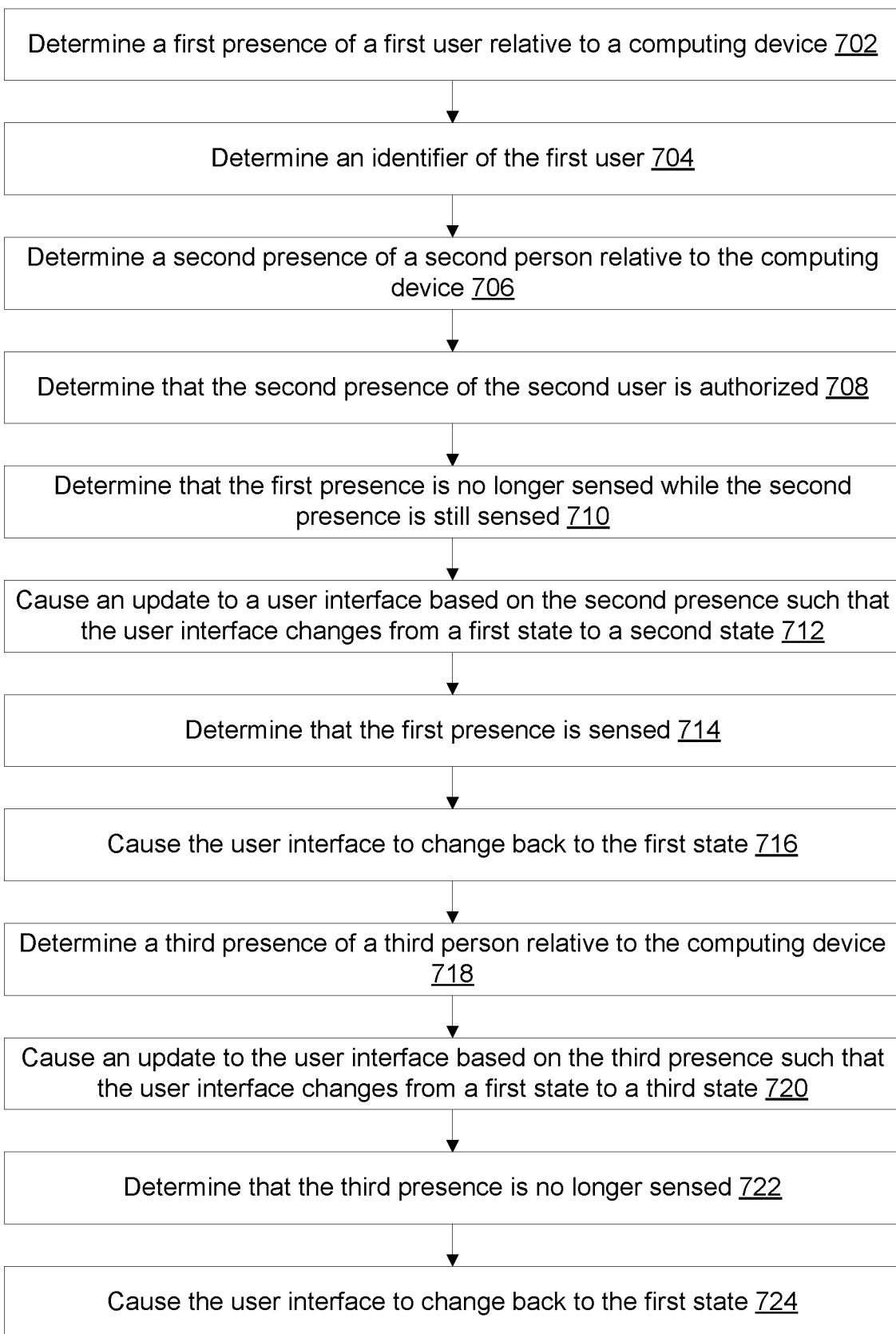
FIG. 7 illustrates an example flow for protecting data based for multiple users of a computing device, according to an embodiment.

FIG. 7 illustrates an example flow for protecting data based for multiple users of a computing device, according to an embodiment. Although two users are illustrated in connection with this flow (e.g., an authorized user and an authorized colleague), the flow similarly apply to a larger number of users.

The example flow starts at operation 702, where a first presence of a first user relative to a computing device is determined. At operation 704, an identifier of the first user is also determined. The operations 702 and 704 are similar to the operation 602 and 604 of FIG. 6, respectively.

At operation 706, a second presence of a second user relative to the computing device is determined. In an example, this determination involves images captured by the image sensor and/or eye tracking system, and/or gaze information generated by the eye tracking system. The start of the second presence can be in parallel to the start of the first presence or can occur later. The second user in this example flow represents an authorized colleague.

At operation 708, a determination is made that the second presence of the second user is authorized. Different techniques are possible for this determination as illustrated in connection with scenarios 450-480 of FIG. 4. In an example, the determination is based on explicit input of the first user indicating his or her authorization for the second user to be in proximity of the computing device or based on identifier of the second user that can be checked against an access control list (ACL).

At operation 710, a determination is made that the first presence is no longer sensed while the second presence is still sensed. For instance, the first user may have moved away from the computing device, whereas the second user may have stayed in proximity thereto. In an example, after an overlapping period of time where both presences were sensed, this determination is made and involves images captured by the image sensor and/or eye tracking system, and/or gaze information generated by the eye tracking system.

At operation 712, an update to a user interface is caused based on the second presence being sensed while the first presence is no longer sensed, such that the user interface changes from a first state to a second state. For example, based on a user setting to automatically update the user interface when the first user is absent, the computing device transitions the user interface from the first state to the second state.

At operation 714, a determination is made that the first presence is sensed again while the second presence is still sensed. For instance, the first user may have returned to the computing device. In an example, this determination involves images captured by the image sensor and/or eye tracking system, gaze information generated by the eye tracking system, and/or the first user re-logging onto the computing device.

At operation 714, the user interface is caused to change back to the first state. For example, the computing device transitions the user interface from the second state to the first state based on the presence of the first user.

At operation 716, a third presence of a second person relative to the computing device is determined. In an example, this determination involves images captured by the image sensor and/or eye tracking system, and/or gaze information generated by the eye tracking system. The third person is detected as being present while the first user and the second user are also present relative to the computing device.

At operation 720, an update is caused to the user interface based on the third presence such that the user interface changes from the first state to a third state. This third state can be the same as the second state or can be a different state, where properly perceiving the presented data is made even harder, and/or where an image or video of the third person is presented in a window on the user interface. In an example, in addition to the third presence, a number of other factors can be used to cause this update. Generally, a determination is made as to whether the third presence is authorized or not. This determination can depend on whether the first presence of the first user is still detected while the third presence is detected or not as described in connection with scenarios 450-480 of FIG. 4. If the third presence is not authorized, the computing device changes the user interface to the third state. Otherwise, the change may not be performed.

At operation 722, a determination is made that the third presence of the third person is no longer sensed. For instance, the third person moved away from the computing device. In an example, this determination involves images captured by the image sensor and/or eye tracking system, and/or gaze information generated by the eye tracking system.

At operation 724, the user interface is caused to change back to the first state. For example, the computing device transitions the user interface from the third state to the first state based on the third presence no longer being sensed and the first presence of the first user still being sensed.

In addition to protecting access to data by updating a user interface based on presence detection, the presence detection can be, alternatively or additionally, used to protect the data itself. For example, a computer system includes two (or more) computing devices that are communicatively coupled over a data network. Each of the computing device includes or is communicatively coupled with an eye tracking system and/or an image sensor. An image sensor can be a component of an eye tracking system or a separate component. A first presence of a first user relative to the first computing device is detected based on images captured by the image sensor and/or eye tracking system associated with this computing device, gaze information generated by the eye tracking system. The first presence of the user is validated (e.g., determined to be authorized or authenticated) based on a first identifier of the first user (e.g., login information or separate facial recognition). Similarly, a first presence of a second user relative to the second computing device is determined and the second presence is validated (e.g., based on the relevant components of the second computing device and the relevant second identifier of the second user). Based on the two presences, an encryption key (or a set of keys) is used to encrypt data to be shared between the two computing devices over the data network.

Different types of keys are possible, including symmetric and asymmetric keys. In the example of symmetric keys, the two computing devices can share the symmetric key. Each computing device would use it for encryption and decryption. In the example of asymmetric key, each computing device is associated with a pair of a public key and a private key. The first computing device encrypts the data it sends to the second computing device with the public key of the second computing device. That second device decrypts the encrypted data with its private key. The same holds true for encryption by the second computing device and decryption by the first computing device.

Different techniques are possible to identify an encryption key (or, similarly, the set of keys). In one example, the encryption key is predefined or pre-negotiated between the two computing devices. Access thereto is controlled by detecting and validating the presences of the two users. If one of the users is absent or if his or her presence is not validated, the access to the encryption key by the user's computing device is denied.

In another example, the encryption key is generated based on the images sensed by the image sensors and/or eye tracking systems, or based on the gaze information. For example, a key generation workflow is executed to generate the encryption key. A first image of the first user, a second image of the second user, first gaze information of the first user, and/or second gaze information of the second user are input to the workflow. For instance, this various information or hash therefrom are used to generate a random 128-bit key.

Figure 8:
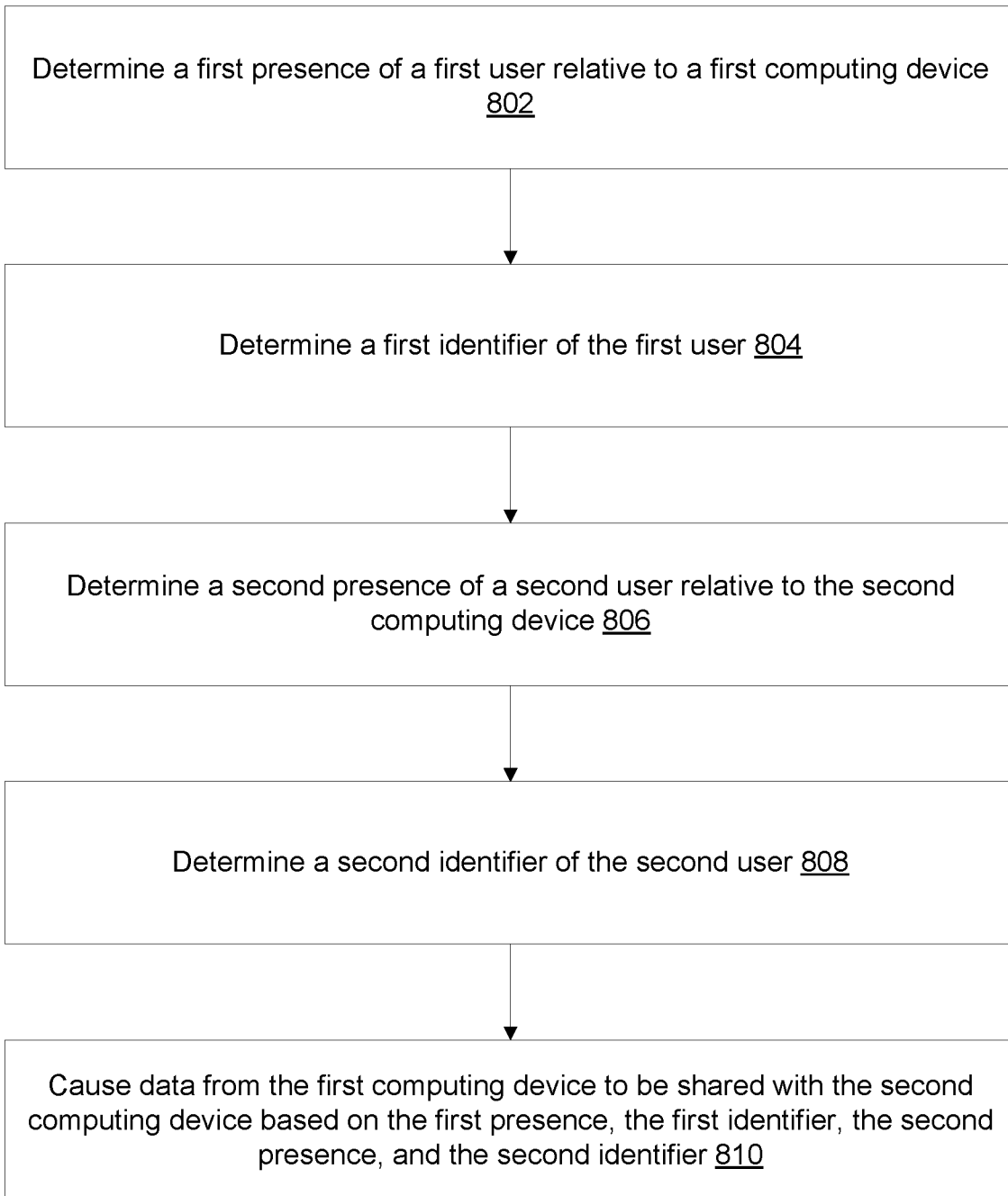
FIG. 8 illustrates an example of a flow for encrypting data based on present detection, according to an embodiment.

FIG. 8 illustrates an example of a flow for encrypting data based on present detection, according to an embodiment. The example flow starts at operation 802, where the computer system determines the first presence of the first user relative to the first computing device. For example, the first computing device detects the first presence based on images captured by the image sensor and/or eye tracking system of the first computing device, and/or gaze information generated by the eye tracking system.

At operation 804, the computer system determines the first identifier of the first user. For example, the first computing device determines that the first user properly logged onto the first computing device based on login information and/or that the first user's presence is valid based on the images of this user (e.g., by applying facial recognition).

At operation 806, the computer system determines the second presence of the second user relative to the second computing device. For example, the second computing device detects the second presence based on images captured by the image sensor and/or eye tracking system of the second computing device, and/or gaze information generated by the eye tracking system.

At operation 808, the computer system determines the second identifier of the second user. For example, the second computing device determines that the second user properly logged onto the second computing device based on login information and/or that the second user's presence is valid based on the images of this user (e.g., by applying facial recognition).

At operation 810, the computer system causes data from the first computing device to be shared with the second computing device based on the first presence, the first identifier, the second presence, and the second identifier. For example, an encryption key is identified (e.g., accessed or generated) based on the presences and identifiers of the two users. The encryption is used in encrypting the data sent from the first computing device to the second computing device. If symmetric encryption is used, that same key can be used by the second computing device to decrypt the encrypted data and to encrypt other data to send to the first computing device. If asymmetric encryption is used, each of the computing devices uses the proper key to encrypt and decrypt data.

In an illustrative example, the data includes a file on the first computing device. Based on the gaze of the first user on a user interface (or, similarly, display) of the first computing device, this file can be encrypted.

Data Access

FIGS. 9-13 relate to embodiments for using gaze information to bring forward data from an open window that is in a background of a user interface. The data is presented by a viewer that acts as a peephole through another window that is open in a foreground of the user interface and that occludes the background window. FIGS. 14-19 relate to embodiments for manipulating data based on gaze information. Data can be moved between locations on a computing device or between computing devices based on the gaze information. Presenting data in a viewer that would have been otherwise occluded and manipulating data are two examples of data access.

Figure 9:
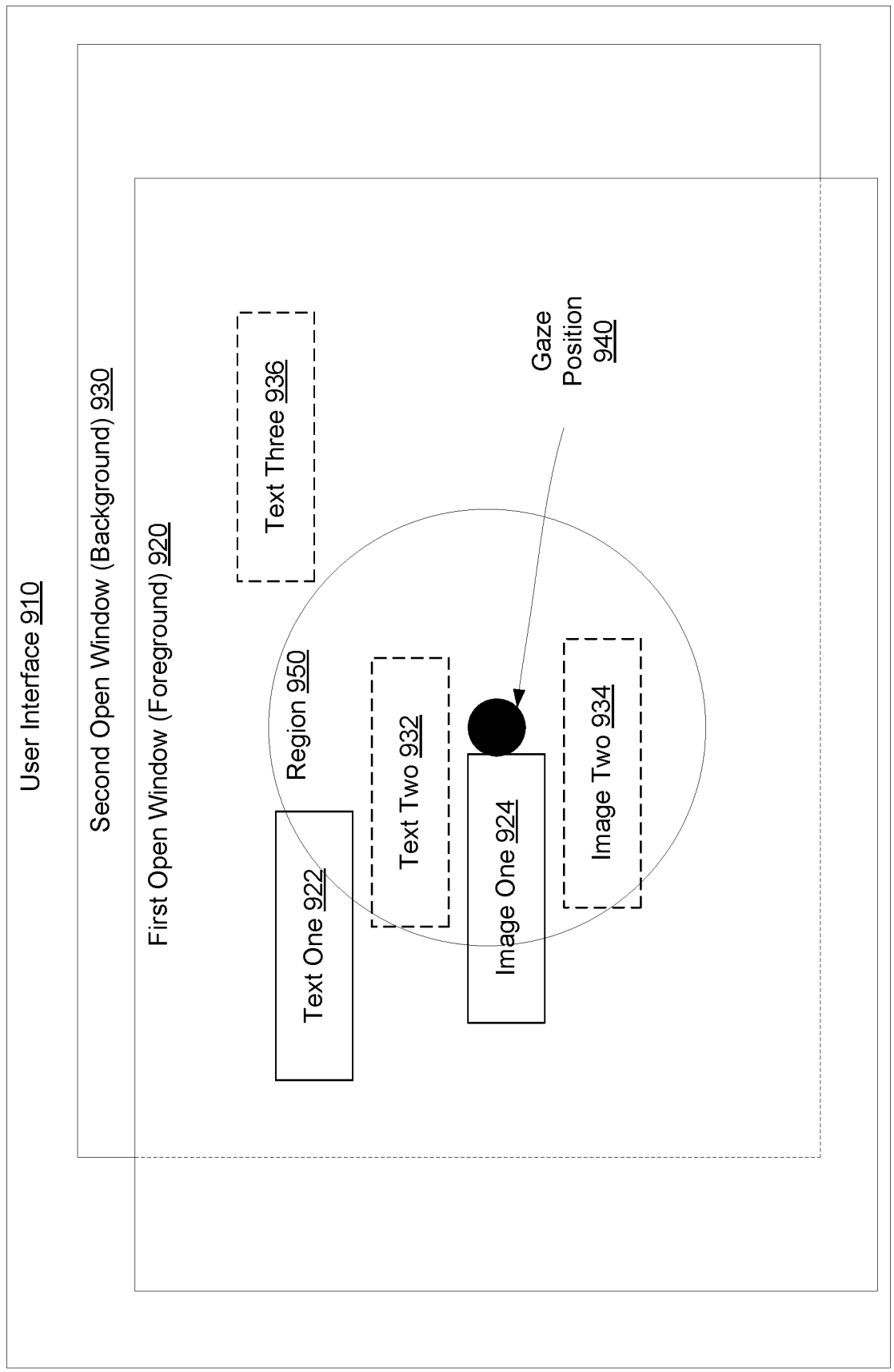
FIG. 9 illustrates an example of a user interface and a determination of a region around a gaze position of a user on the user interface, according to an embodiment.

FIG. 9 illustrates an example of a user interface 910 and a determination of a region 950 around a gaze position 940 of a user on the user interface 910, according to an embodiment. As illustrated, when presented on a computing device (e.g., on a display of the computing device), the user interface 910 includes a first open window 920 in the foreground of the user interface 910 and a second open window 930 in the background of the user interface 910. Of course, a different number of open windows is possible, whether in the foreground or the background. An open window can be a window that presents data and can be rendered by the operating system (OS) of the computing device or an application (e.g., non-native application) running on the computing device. An open window in the foreground refers to a window that is open (e.g., could be minimized), active, and typically not occluded by other windows. An open window in the background refers to a window that is open, is not active, and can be but is not necessarily occluded by another open window. For ease of reference, the first open window 920 in the foreground is referred to herein as a foreground window. And the second open window 930 in the background is referred to herein as a background window.

The foreground window 920 presents different elements including, for instance, text elements 922 and image elements 924 (e.g., an icon and a file name for a file in a file explorer window, or web content in a web browser). Portions of the background window 930 are occluded by the foreground window 920 as shown with the dashed lines in FIG. 9. The background window also includes text elements 932 and 936 and image elements 934. The presentation of these elements 932-936 is hidden in the user interface 910 because of the occlusion by the foreground window 920.

The gaze position 940 is detected by an eye tracking system of the computing device. The region 950 is defined around the gaze position 940. Generally, this region 950 is sub-region (or portion) of the user interface 910 that partially or fully surrounds the gaze position 940. In an example, the region 950 has predefined shape and size (e.g., a circle with a particular pixel radius) and is initially centered around the gaze position 940 (but maintaining this centering at all times is not necessary as further described next).

The region 950 is used for multiple reasons. One reason is to define a viewer (e.g., a peephole as further described in connection with the next figures). Another reason relates to the gaze position 940. As the user's eyes tend to move and his or her gaze tend to change, the region 950 is used to define a margin around changes to the gaze position 940 before having to update the viewer. For example, as long as the gaze falls within the region 950, the viewer can be maintained in place. As the gaze approaches the edge of the region 950, the update to the viewer can commence. Accordingly, the region 950 can be referred to herein as a gaze region.

In an example, the size and/or shape of the region 950 can be specified in a user setting. In another example, the distance of the user to the user interface 910 (or the display) can be used to set the size and/or shape. This distance can be derived from the gaze information. In an illustration, the closer the user is, the larger the region 950 can become. In yet another example, the size and/or shape of the region 950 depends on the proximity of the gaze position 940 to the edge of the user interface 910 (or the display). For instance, while the gaze position 940 is in the center of the user interface, the region 950 has a predefined shape and size. When the gaze position 940 is proximate to the edge (e.g., within a pixel distance smaller than the pixel radius of the region 950), the region 950 can be resized (e.g., made smaller) to maintain its shape (e.g., a circle) or, alternatively, its size and shape can stay the same but its position would be shifted such that the region 950 is fully contained in the user interface 910 while a portion of its edge is adjacent to the edge of the user interface 910.

Figure 10:
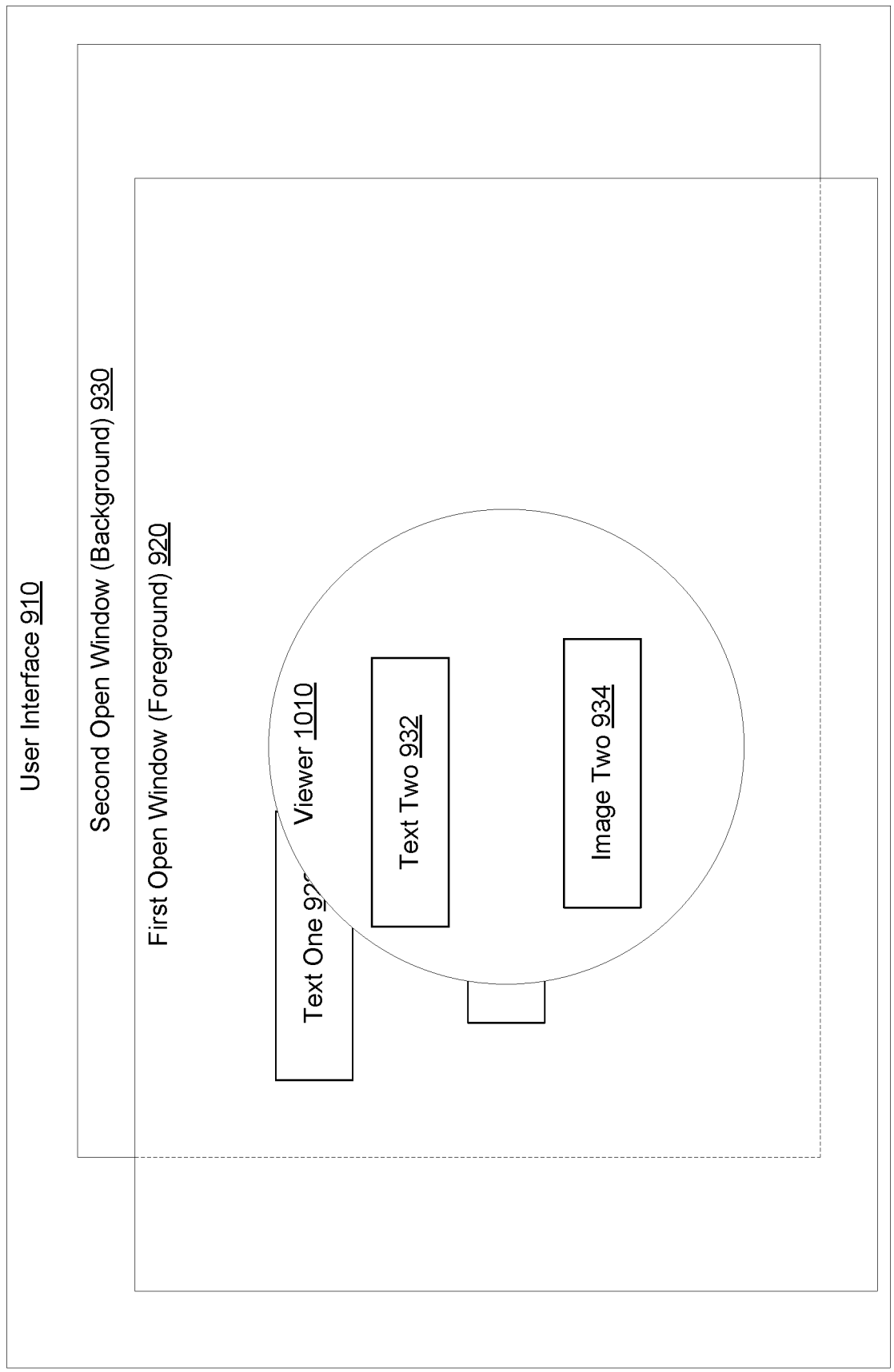
FIG. 10 illustrates an example of a viewer presented on the user interface of FIG. 9, according to an embodiment.

FIG. 10 illustrates an example of a viewer 1010 presented on the user interface 910 of FIG. 9, according to an embodiment. The viewer 1010 is presented over the foreground window 920 and shows a snapshot of at least a portion of the background window 930. In this way, the viewer 1010 acts as a peephole through the foreground window 920 allowing the user to perceive the content of the background window 930 without having to activate and bring this window 930 to the foreground.

In an example, the viewer 1010 has substantially the same shape as the region 950 or has a shape that can encompass the region 950. Further, the size of the viewer 1010 can be equal to or larger than the size of the region 950. Generally, the viewer 1010 is centered around the center of the region 950. Further and similarly to the sizing and shaping of the region 950, the size and/or shape of the viewer 1010 can depend on similar factors, including a user setting, the distance of the user to the user interface 910 (or the display), and the proximity of the gaze position 940 to the edge of the user interface 910 (or the display).

The viewer 1010 can be activated by a keystroke or a combination of keystrokes or some other user input (e.g., a mouse click and hold). The activation trigger can be defined in a user setting. Once the activation trigger is detected, the computing device determines the gaze position 940, generates the region 950, takes a snapshot of the background window 930, determines a portion of the snapshot that corresponds to the location of the viewer 1010 on the user interface, and presents this portion of the snapshot in the viewer 1010.

As illustrated in FIG. 10, the viewer 1010 occludes portions of the text elements 922 and image elements 924 of the foreground window 920 because it is overlaid on top of the foreground window 920 (without necessarily deactivating the foreground window 920 or setting this window 920 to the background). The viewer 1010 also presents the text element 932 and the image elements 934 of the background window 930 because these elements 922 and 924 fall in the region 950 (as illustrated in FIG. 9). The other text element 936 of the background window 930 is not illustrated in FIG. 10 to emphasize that this element 936 is not in the viewer 1010 and would not be visible to the user because it is outside of the region 950.

When multiple background windows are available in the user interface 910, user input can select or switch between these windows (e.g., based on a mouse click or a keystroke). The viewer 1010 is updated to present the relevant portion of the selected background window.

Figure 11:
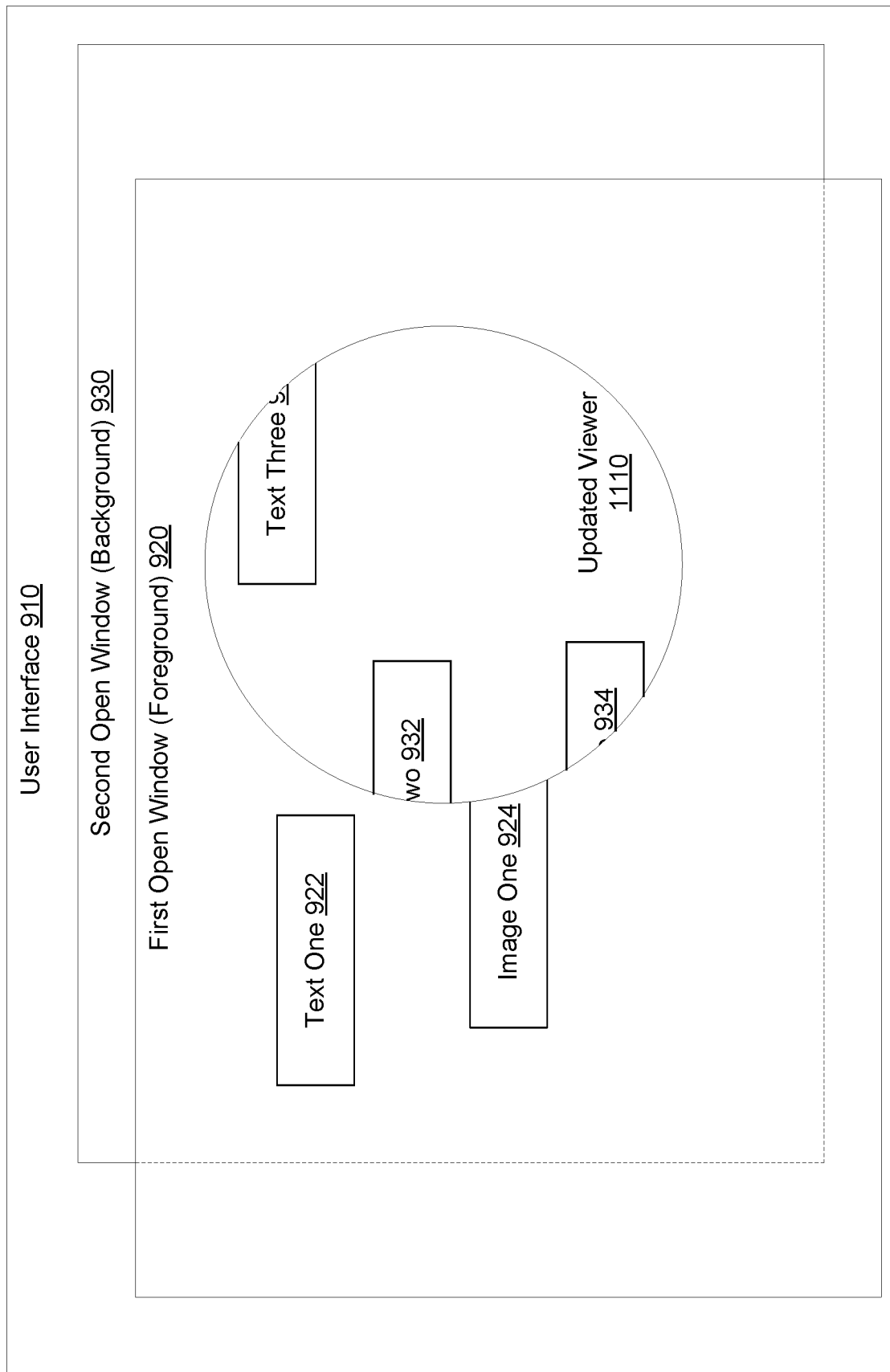
FIG. 11 illustrates an example of updating the viewer to track the gaze position as the gaze of the user moves across the user interface, according to an embodiment.

FIG. 11 illustrates an example of updating the viewer 1010 to track the gaze position as the gaze of the user moves across the user interface 910, according to an embodiment. The updated viewer 1010 is shown as viewer 1110 in FIG. 11.

Generally, if the gaze position 940 falls within the region 950, the viewer 1010 (and the region 950) are not updated on the user interface. Once the gaze position 940 is outside the region 950, an updated region is defined around the updated gaze positon. This updated region can be initially centered around the updated gaze position. The viewer 1110 is then generated and defined around the updated region. Hence, as the user's gaze moves around the user interface 910 and his or her gaze is tracked, the viewer (and the underlying region) can be updated depending on the most current gaze position. In this way, the viewer is, in a way, a movable peephole that lets the user to move around the user interface and view different portions of the background window 930.

As illustrated in FIG. 11, the user's gaze shifts upward to the right. The updated viewer 1110 is accordingly presented upward to the right (relative to the viewer 1010 of FIG. 10). At the new location on the user interface, the updated viewer 1110 now shows only portions of the text elements 932 and image elements 934 from the background window 930. However, a portion of the other text elements 936 falls within the updated viewer 1110. Hence, the updated viewer 1110 now shows this portion of the other text elements 936.

In addition to allowing the user to gaze around the user interface 910 to view different portions of the background window 930, other techniques are possible to provide this different portions showing through a viewer without having to change the gaze position. For example, based on user input (e.g., a keystroke or a mouse click) or based on the distance of the user to the user interface 910 (or the display), the resolution of the shown portion of the background window 930 is updated. For example, this user input indicates or the distance controls a warping operation or a zoom level to be applied to the snapshot of the background window 930. For instance, the closer the user is to the user interface 910, the more zooming out is applied to the snapshot in order to provide a wider view field of the background window 930. In this way, the viewer can act as a true peephole on a door, where the closer the user leans onto it on the inside, the wider the view of the outside becomes.

Figure 12:
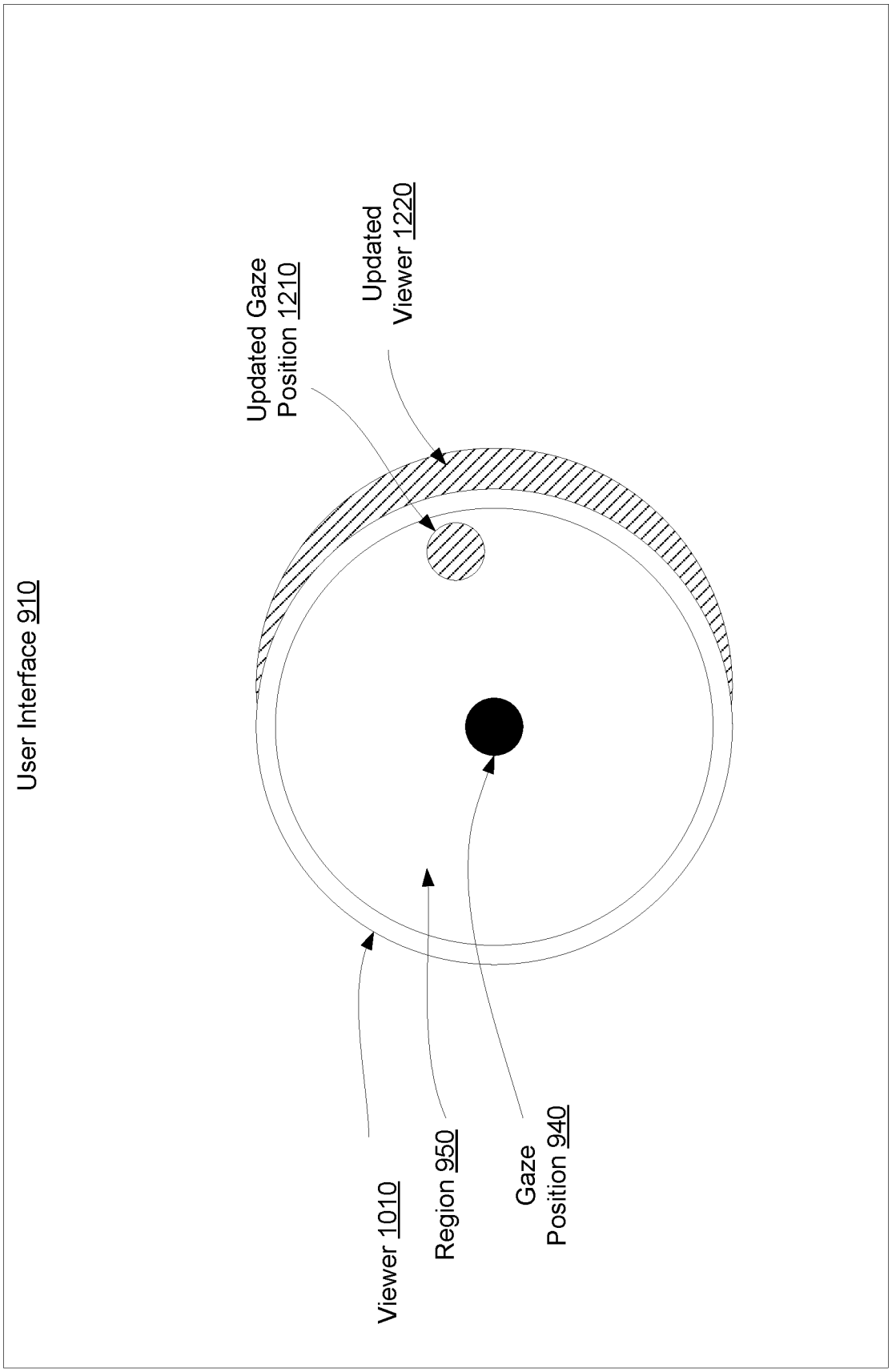
FIG. 12 illustrates an example of relative positioning of the gaze position, the region, and the viewer, and how the viewer is updated when the gaze position approaches an edge of the region, according to an embodiment.

FIG. 12 illustrates an example of relative positioning of the gaze position 940, the region 950, and the viewer 1010, and how the viewer 1010 is updated when the gaze position 940 approaches an edge of the region 950, according to an embodiment. As illustrated, the region 950 is initially centered around the gaze position 940. The viewer 1010 is also initially centered around the region 950.

If the gaze position 940 changes but stays within the region 950, no updated region is defined. The gaze position 940 can approach the edge of the region 950 (illustrated in FIG. 12 as updated gaze position 1210). In an example, an inner perimeter of the region 950 is defined to determine whether this approaching occurred or not. The inner perimeter can be defined as a function of the outer boundary of the region 950 (e.g., 90% of the pixel radius of the region 950). Once the updated gaze position 1210 crosses the inner perimeter of the region 950 but not its outer boundary, a determination is made that the updated gaze position 1210 has approached the edge of the region 950. In this, an updated viewer 1220 is presented on the user interface.

The updated viewer 1220 can be presented simultaneously with the presentation of the viewer 1010 on the user interface 910 for a time period during which the updated gaze position 1210 is between the inner perimeter and the outer boundary of the region 950. If the updated gaze position 1220 moves back to the inside of the gaze region 950 by crossing the inner perimeter, the presentation of the updated viewer 1210 is removed from the user interface 910. If the updated gaze positon 1210 crosses the outer boundary of the region 950, an updated region is defined and the updated viewer 1220 can but need not be modified to be re-centered around the updated region.

By using the updated viewer 1220 and presenting it simultaneously with the viewer 1010, the transition between the viewers can be made more smooth and would appear more natural to the user. As illustrated, when both viewers are presented, they overlap (e.g., they have overlapping portions) and the updated viewer 1220 can be have a different transparency than that of the viewer 1010 (e.g., can be relatively more transparent). During the simultaneous presentation, portions of the background window 930 can but need not be only shown in the viewer 1010 and not the updated viewer 1210. When the viewer 1010 is no longer presented on the user interface 910, the properties (e.g., transparency) of the updated viewer 1220 to be similar to those of the viewer 1010 when presented. The relevant portions of the background window 930 are then presented in only the updated viewer 1220.

Figure 13:
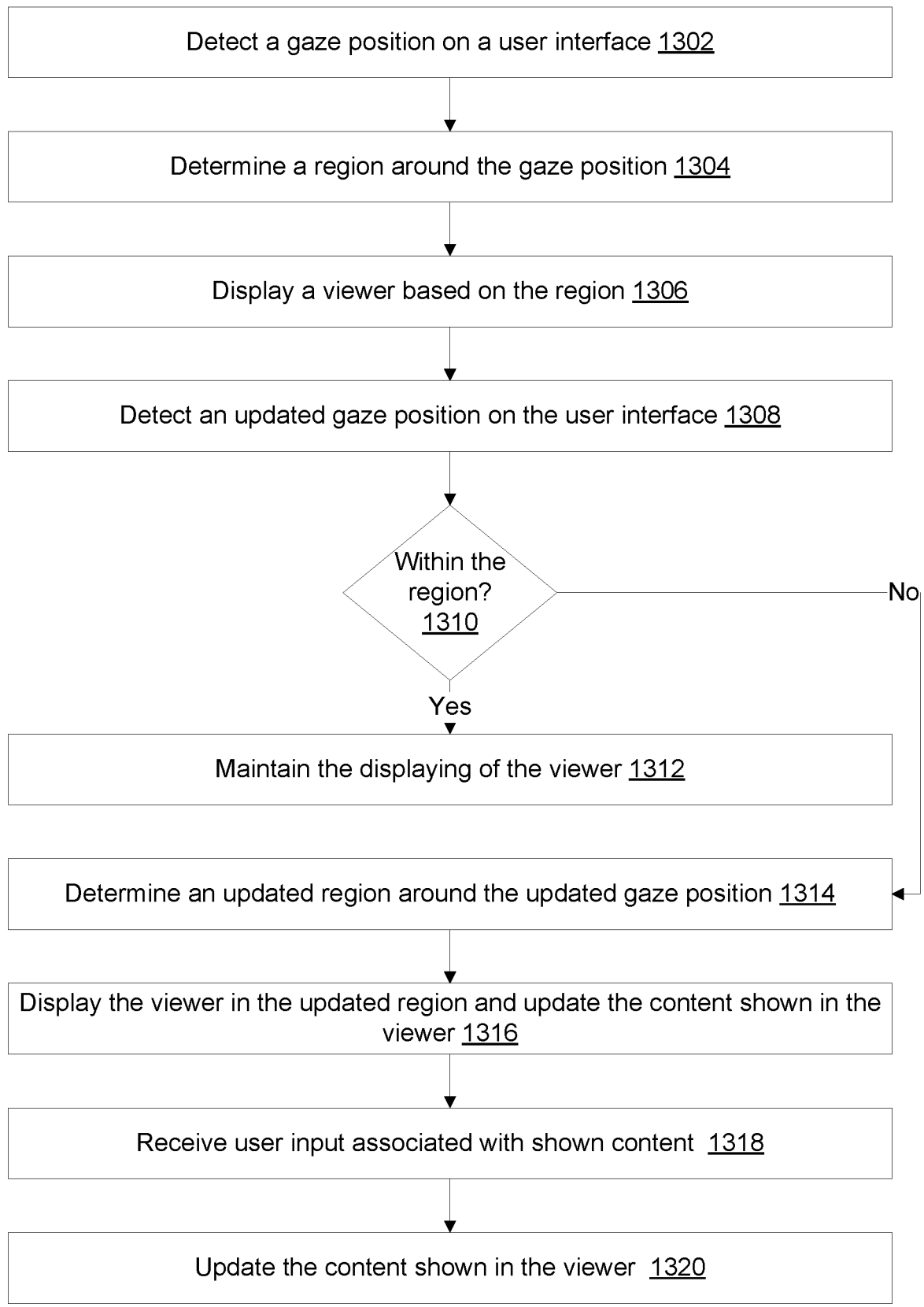
FIG. 13 illustrates an example of a flow for presenting a viewer, according to an embodiment.

FIG. 13 illustrates an example of a flow for presenting a viewer, according to an embodiment. The example flow is described in connection with a computer system. The computer system includes a computing device presenting a user interface and an eye tracking system communicatively coupled with the computing device. If the eye tracking system is integrated in the computing device, the computer system represents the computing device.

The example flow starts at operation 1302, where the computer system detects a gaze position on the user interface. At operation 1304, the computer system determines a region, such as a gaze region, around the gaze position. At operation 1306, the computer system displays a viewer based on the region. For example, the viewer is centered around the region and has a size equal to or larger than the region. The viewer shows a snapshot of a portion of an open window that is in the background of the user interface. The computer system overlays the viewer on top of an open window that is in the foreground of the user interface without switching this window to the background. In an example, the computer system generates a snapshot of the background window and determines the portion of the snapshot that corresponds to the location of the viewer (e.g., based on coordinates of the viewer and coordinates of the snapshot, where a coordinate system can be defined relative to the user interface). The computer system presents this portion of the snapshot in the viewer.

At operation 1308, the computer system determines an updated gaze positon on the user interface. At operation 1310, the computer system determines whether the updated gaze position falls within the region or not. If so, operation 1312 is performed. Otherwise, operation 1314 is performed.

At operation 1312, the updated gaze position is still within the region. Accordingly, the computer system maintains the displaying of the viewer. For example, the computer system does not update the presentation of the viewer. Further, the computer system may determine whether the updated gaze positon has approached an edge of the region and, if so, simultaneously presents an updated viewer as described in connection with FIG. 12.

At operation 1314, the updated gaze position is outside of the region. Accordingly, the computer system determines an updated region around the updated gaze position. At operation 1316, the computer system displays the viewer in the updated region and updates the content shown in the view. For example, the computer system displays an updated viewer that is centered around the updated region and determines a different portion of the snapshot that falls in the updated viewer. That position is presented in the updated viewer.

At operation 1318, the computer system receives user input associated with the shown content in the viewer. For example, the user input indicates a warping operation or a zooming level to be applied to the snapshot. In another example, instead of receiving an explicit user input, the user leans towards (or away from the user interface). The user-to-user interface distance is estimated (e.g., based on the user's gaze) and that distance is used to control the warping operation or the zoom level. Additionally or alternatively, the computer system receives user input switching between the background windows.

At operation 1320, the computer system updates the content shown in the viewer based on the user input(s) and/or user-to-user interface distance of operation 1318. For instance, if the user input or the distance indicates a zooming out, the viewer is updated to show a zoomed out portion of the background window. If the user input indicates a selection of a different background window, the viewer is updated to show the relevant portion of a snapshot of this other background window.

Figure 14:
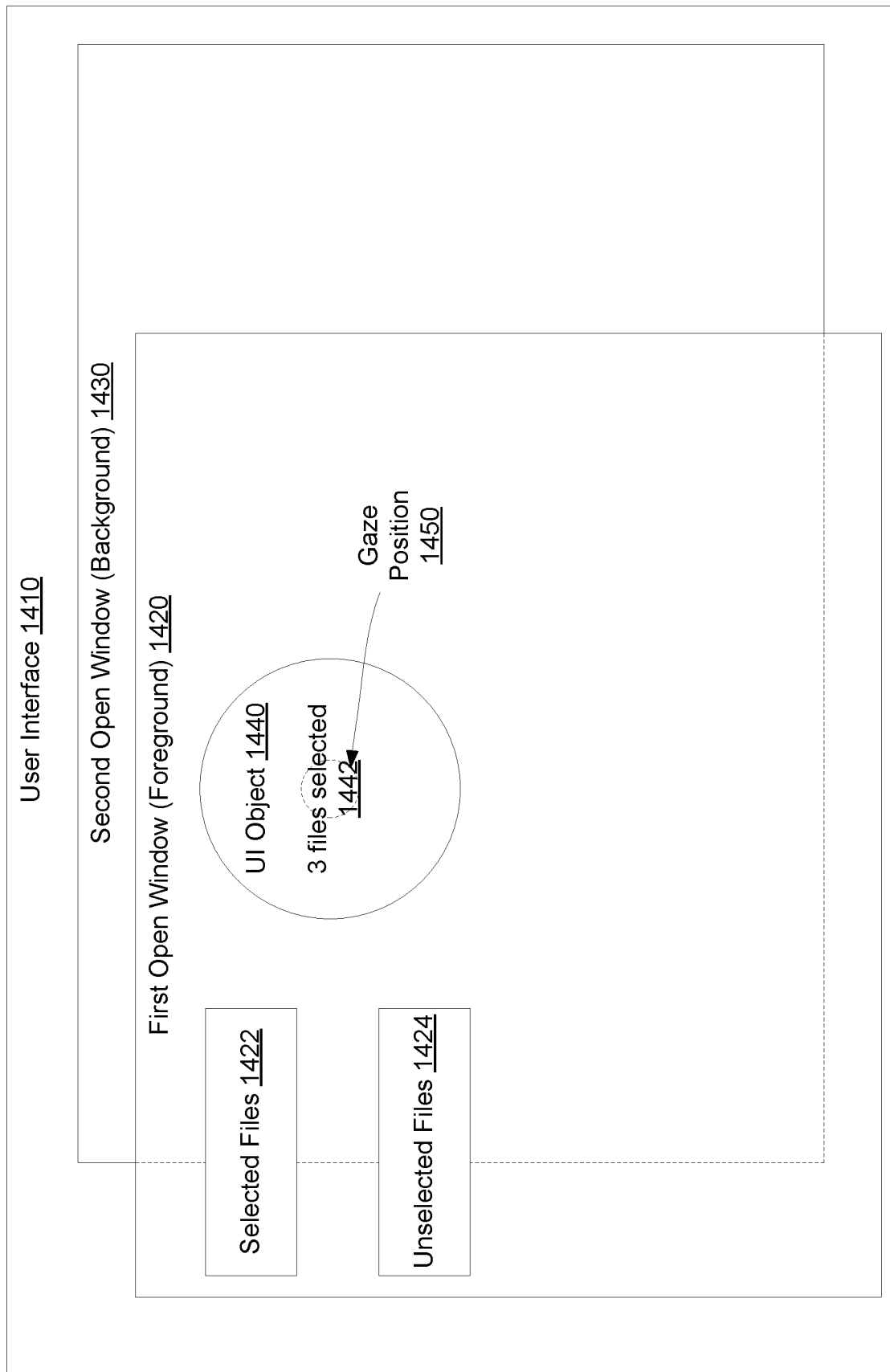
FIG. 14 illustrates an example of using a user interface (UI) object based on gaze information to manipulate data, according to an embodiment.

FIG. 14 illustrates an example of using a user interface (UI) object based on gaze information to manipulate data, according to an embodiment. In the interest of clarity of explanation, the embodiment is described in connection with examples of copying and pasting files from a source folder to a destination folder. A file is a type of the data that can be manipulated based on the UI object. However, the embodiment similarly apply to other types of data and/or of data manipulation. For example, the data includes a document (e.g., a structured document like a Microsoft Word document) that is open in an application (e.g. Microsoft Word application) on a first computing device. The UI object is usable to open the document in a different application (e.g., Google Docs application) on the first computing device or on a second computing device, and/or open the document in a different instance of the same application on the second computing device. In this example, the document in the application of the first computing device (e.g., the first instance of the application) has a state (e.g., the Microsoft Word document is ten pages long, and page five is rendered in the Microsoft Word application on the first computing device). When opened by the other application (e.g., Google Docs application) on the first computing device or by the second instance of the application on the second computing device (e.g. Microsoft Word application), the document is also open in the same state (e.g., page five is rendered).

As illustrated in FIG. 14, when presented on a computing device (e.g., on a display of the computing device), the user interface 1410 includes a first open window 1420 in the foreground of the user interface 1410 and a second open window 1430 in the background of the user interface 410. Of course, a different number of open windows is possible, whether in the foreground or the background. In the example of files as a type of data, the foreground window 1420 can be a first open folder in the foreground (referred to herein as a foreground folder) listing the various available files data, and the background window 1430 can be a second open folder in the background (referred to herein as a background folder) to which some or all of the available files can be copied. In other words, the foreground folder is a source folder and the background folder is a destination folder. In the example of FIG. 14, the two folders are on the same computing device. Nonetheless, and as illustrated in connection with FIG. 18, the two folders can be on separate computing devices.

A UI object 1440 is used to place data available from the foreground window 1420 into the background window 1430. For example, selected files 1422 are copied from the foreground window 1420 (or the source folder) and pasted in the background window 1430 (or the destination folder). Other files 1424 available from the foreground window 1420 may not be selected and, thus, are not copied to the background window 1430. The placing of the data (e.g., the pasting of the selected files 1422) need not activate the background window 1430. In other words, the background window 1430 stays in the background of the user interface 1410.

Various triggers are possible to invoke the UI object 1440. In one example user input, such as a particular combination of keystrokes, a particular keystroke after the selection and copying of the selected files 1422, can be used to activate the UI object 1440. This user input can be received prior to, in parallel with, or after selecting and/or copying the selected files 1422.

Generally, the UI object 1440 is positioned on the user interface 1410 at the gaze position 1450 at the time the UI object 1440 was invoked. For example, the UI object 1440 is centered around the gaze position 1450 and is presented in the foreground of the user interface 1410 as an overlay on top of the foreground window 1420. If the gaze position 1450 changes thereafter based on the movement of the user's gaze, the position of the UI object 1440 is changed to track the updated gaze position.

When presented, the UI object 1440 can have a predefined shape and size such as a bubble or a circle. Of course, other geometric shapes are possible and can be specified in a user setting. The shape, size, and/or other visual properties of the UI object 1440 may change depending on the amount of manipulated data. For example, the larger the number of selected files 1422 is, the larger the bubble can be made or the more alerting its color becomes (e.g., gradually changes from green to yellow and from yellow to red with an increase in the number of selected files 1422).

In addition, the UI object 1440 can present various types of information about the manipulated data. FIG. 14 illustrates one example of such information. As illustrated, the UI object 1440 shows the amount 1442 of the manipulated data (e.g., the total number of selected and copied files 1422).

Figure 15:
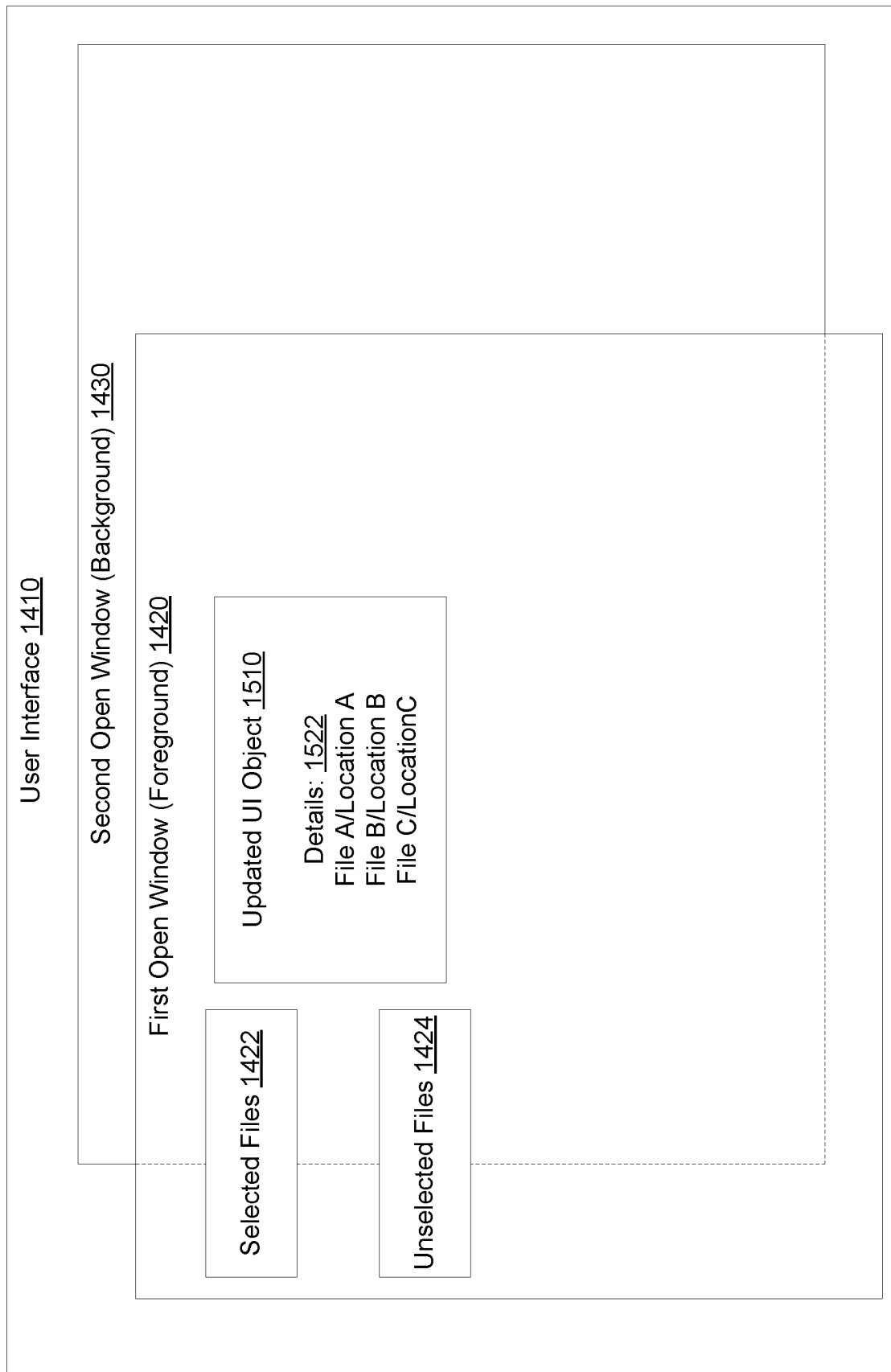
FIG. 15 illustrates an example of information presented in the UI object, according to an embodiment.

FIG. 15 illustrates another example of information presented in the UI object, according to an embodiment. For example, user input, such as a particular keystroke or a consistent gaze at a same gaze position of a time period exceeding a time threshold, is provided to provide details about the manipulated data. In this case, the UI object 1440 is updated and the updated UI object (shown as element 1510) is expanded to show the details 1420. For instance, the updated UI object 1510 has a different shape (e.g., a rectangle instead of a circular bubble) and its size is increased to provide relevant details (e.g., in the case of files, the file names and source locations of the selected files 1422).

In an example, the same user input or a different one also pauses the movement of the updated UI object 1510. Hence, the updated UI object 1510 is shown at a constant location on the user interface 1410 (e.g., at a location corresponding to the last gaze position prior to receiving the user input). In this way, the user can pause the data manipulation. Additional user input can be received to resume or to cancel the data manipulation. If resumed, the updated UI object 1510 can be changed back to the original UI object 1440 and the UI object 1440 would follow the gaze position from that point on. If canceled, the updated UI object 1510 is removed from the user interface 1410.

Figure 16:
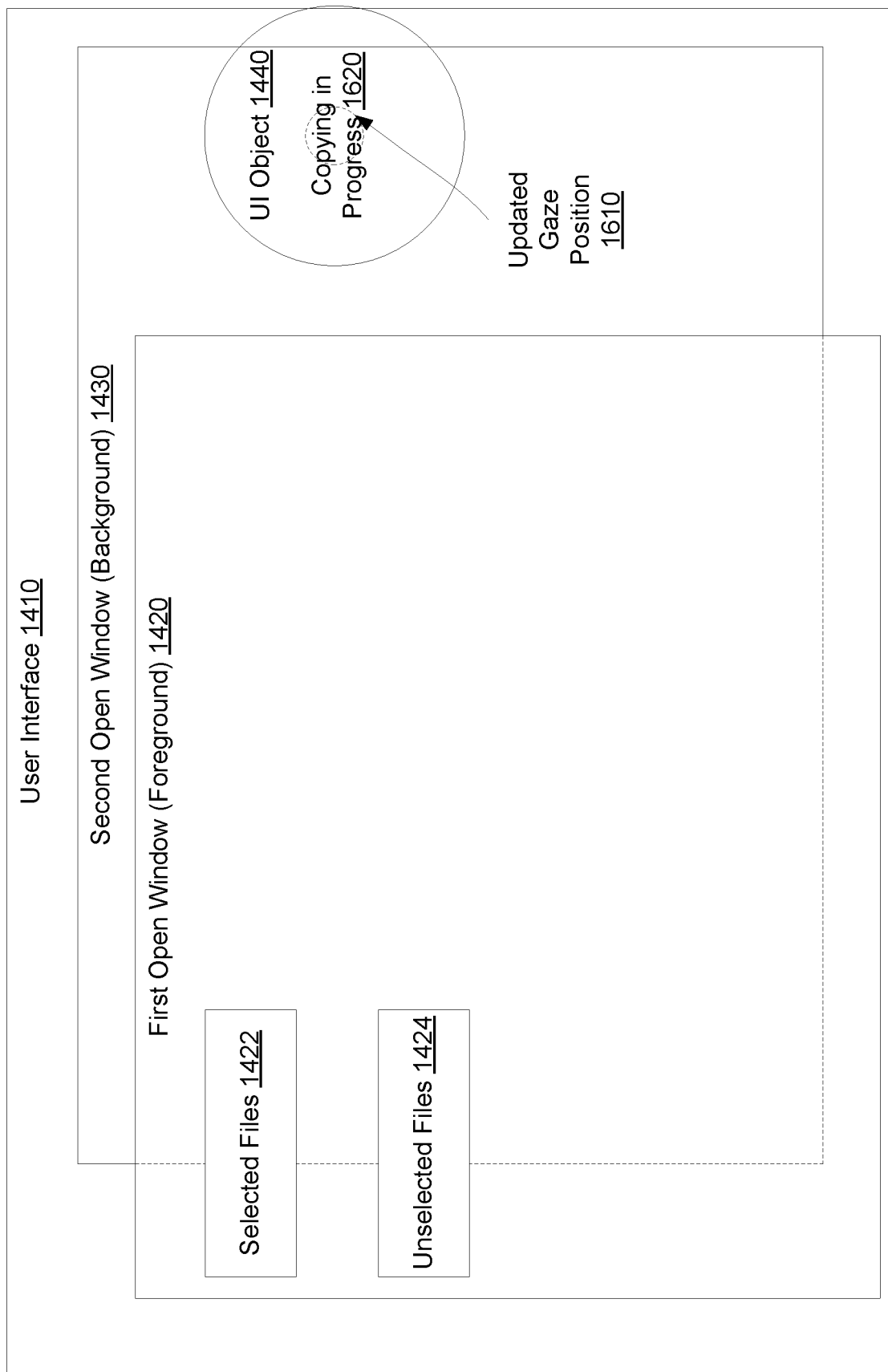
FIG. 16 illustrates an example of completing the data manipulation by using the UI object, according to an embodiment.

FIG. 16 illustrates an example of completing the data manipulation by using the UI object 1440, according to an embodiment. In an example, the UI object 1440 follows the user's gaze. Hence, upon detecting that the gaze position 1610 is over the background window 1430, the computing device presents the UI object 1440 at that position over the background window 1430 without bringing the background window 1430 to the foreground of the user interface 1410. Upon receiving user input to complete the data manipulation (e.g., a particular keystroke or keystroke combination, a mouse click, etc.) while the UI object 1440 is over the background window 1430 (or, equivalently, the gaze position 1610 is at that location), the computing device completes the data manipulation. For example, the computing device places the selected and copied data in the background window 1430 without activating it (e.g., pastes the selected and copied files 1422 in the destination folder without bringing this folder to the foreground of the user interface 1410).

In addition, the computing device can update the content of the UI object 1440 to show the progress of the data manipulation completion. For example, the UI object 1440 indicates visually the percentage of the copied data (e.g., the number of the pasted files). This visual indication can be a number (e.g., a percentage), a status bar, and/or a check sign (e.g. upon the completion).

Figure 17:
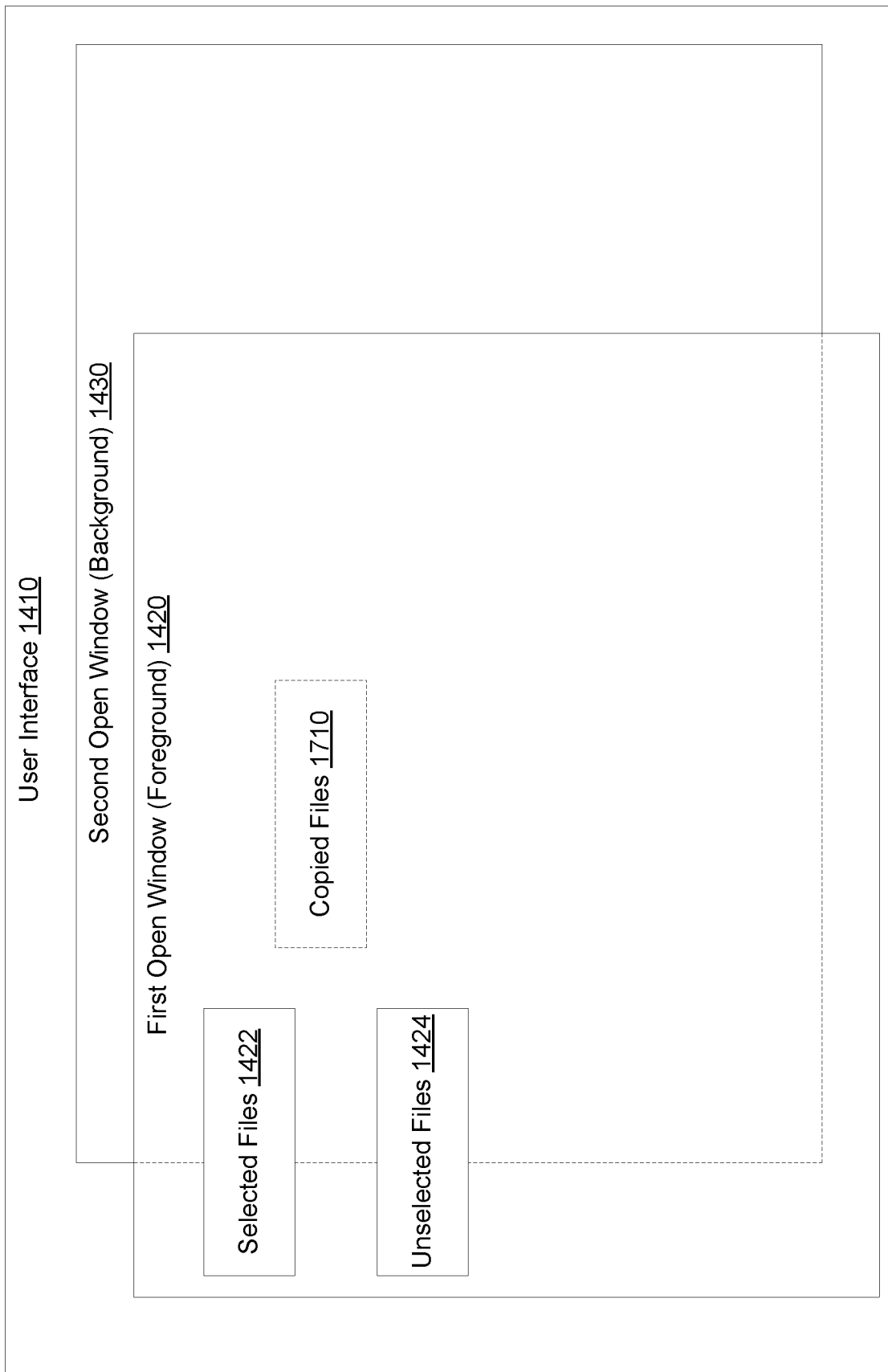
FIG. 17 illustrates an example of the result of competing the data manipulation based on the UI object, according to an embodiment.

FIG. 17 illustrates an example of the result of competing the data manipulation based on the UI object 1440, according to an embodiment. As illustrated, upon the completion of the data manipulation, the UI object 1440 is dismissed and no longer presented on the user interface. The data is placed in the background window 1430 without activating it. This is illustrated in FIG. 17 with element 1710 outlined with dashed lines to emphasize the placed data 1710 is now in the background window 1730 but the presentation of this placed data 1710 is occluded by the foreground window 1420. Hence, in the example of files, the copied files are pasted in the destination folder without bringing this folder to the foreground of the user interface 1410.

Figure 18:
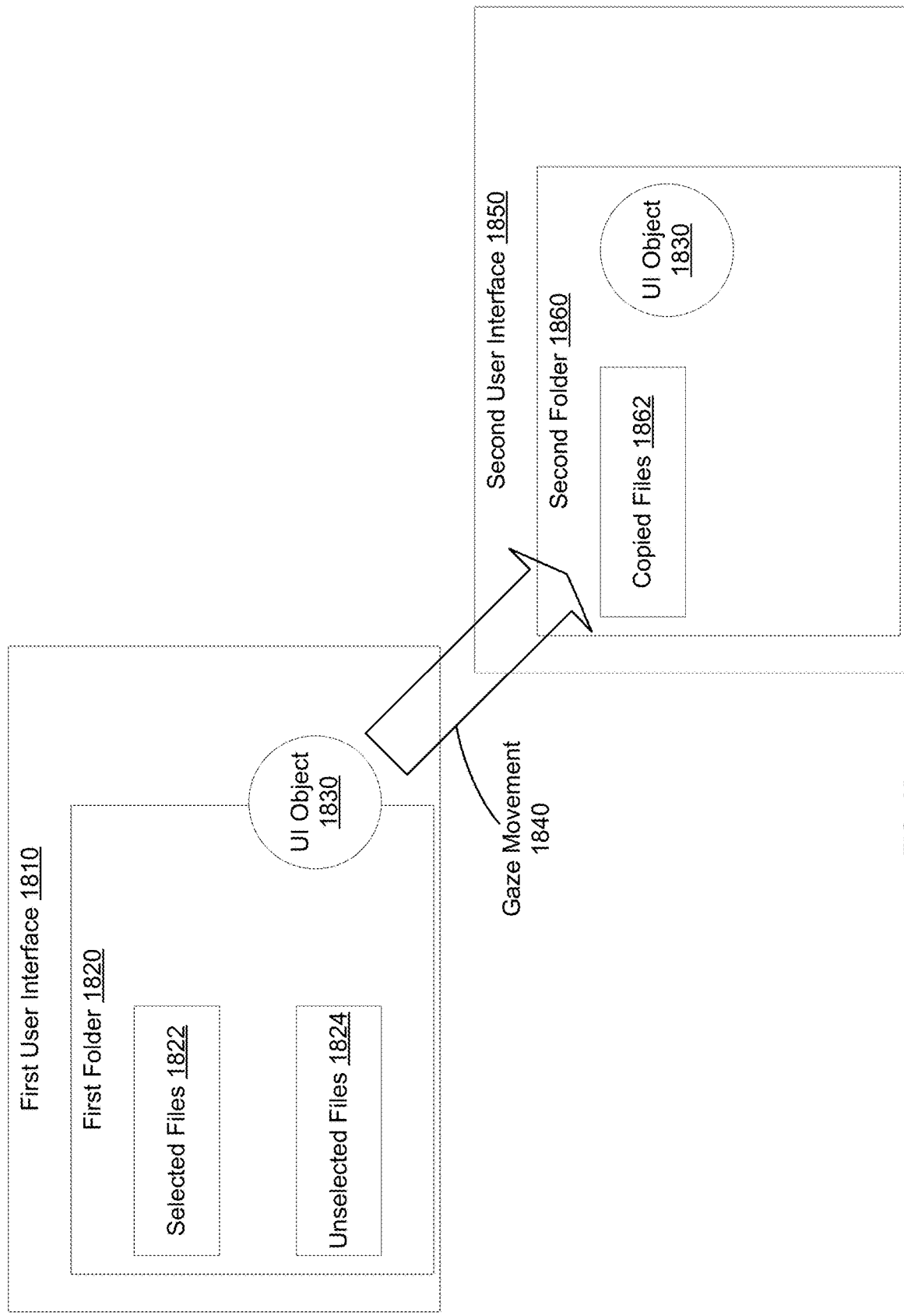
FIG. 18 illustrates an example of data manipulation across two computing devices based on a UI object, according to an embodiment.

FIG. 18 illustrates an example of data manipulation across two computing devices based on a UI object, according to an embodiment. Although two computing devices are illustrated, the embodiment similarly apply to a larger number of computing devices.

In an example, the two computing devices are communicatively coupled over a data network and each of these devices uses a separate eye tracking system. The two eye tracking systems are also communicatively coupled over the data network. Generally, the two computing devices are in proximity of each other such that a user can gaze at one and then move his or her gaze to the next one. In this example, a single coordinate system is defined for the two eye tracking systems (e.g., its origin is at the bottom left corner of the user interface of the computing device that is on the left hand side of the other one). In this way, gaze position and information about the UI object (e.g., its coordinate location) can be referenced against the coordinate system and exchanged between the two computing devices.

As illustrated, the first computing device presents a first user interface 1810 (e.g., on a display of the first computing device). When presented, the first user interface 1810 includes a first source folder 1820 that contains a number of files (or, more generally, a foreground window that presents data). Some of these files (or data) are selected based on user input (shown as selected files 1822) while remaining ones are not selected (shown as unselected files 1824).

Similarly to what is described herein above in connection with FIGS. 14-17, a UI object 1830 is invoked and follow the gaze position. The user's gaze moves 1840 from the user interface 1810 of the first computing device to a user interface 1850 of the second computing device (e.g., presented on a display of the second computing device). Accordingly, the information about the UI object 1830 is sent from the first computing device to the second computing device over the data network. The information includes identifiers of the copied files (or the copied files themselves) and/or other content of the UI object 1830 (e.g. the number of copied files or the total amount of copied data, details about the files or data, etc.), visual properties of the UI object 1830 (e.g., shape, size, color, etc.).

Based on the gaze position on the second user interface 1850 and the received information about the UI object 1830, the second computing device displays the UI object 1830 on the user interface (e.g., in the foreground). Conversely, the first computing device dismisses the presentation of the UI object 1830. In an example, the second computing device preserves the visual properties of the UI object 1830 such that the move from the first user interface 1810 to the second user interface 1850 appears seamless to the user. In another example, the second computing device changes one or more of the visual properties of the UI object 1830 (e.g., changes its color) to alert the user of the transition of the UI object 1830 from the first user interface 1810 to the second user interface 1850. In both examples, the content of the UI object 1830 is generally not altered such that the UI object 1830 can show the same information on the second user interface 1850 that it would have been capable to show on the first user interface 1810.

When presented, the second user interface 1850 includes a second destination folder 1860 to which the files are to be copied (or, more generally, a background window in which the data should be placed). Upon receiving user input and while the UI object 1830 is positioned over the destination folder 1860 (or, equivalently, the gaze position is over that folder 1860), the second computing device pasts the files to the destination folder 1860 (shown as copied files 1862), without activating the destination folder 1860 (e.g., without bringing it to the foreground). In an example, the selected files 1822 are automatically received from the first computing device via a push therefrom when the gaze position moves to the second computing device. In another example, the second computing device identifies the selected files 1822 based on the information passed with the UI object 1830 and pulls (e.g., request and receive) these files 1822 from the first computing device. In both examples, the second computing device pastes the received files to the second destination folder 1860. Although FIG. 18 describes sending selected files to a folder in a background of a user interface, the embodiment similarly applies to sending such files to a folder in a foreground of the user interface.

Figure 19:
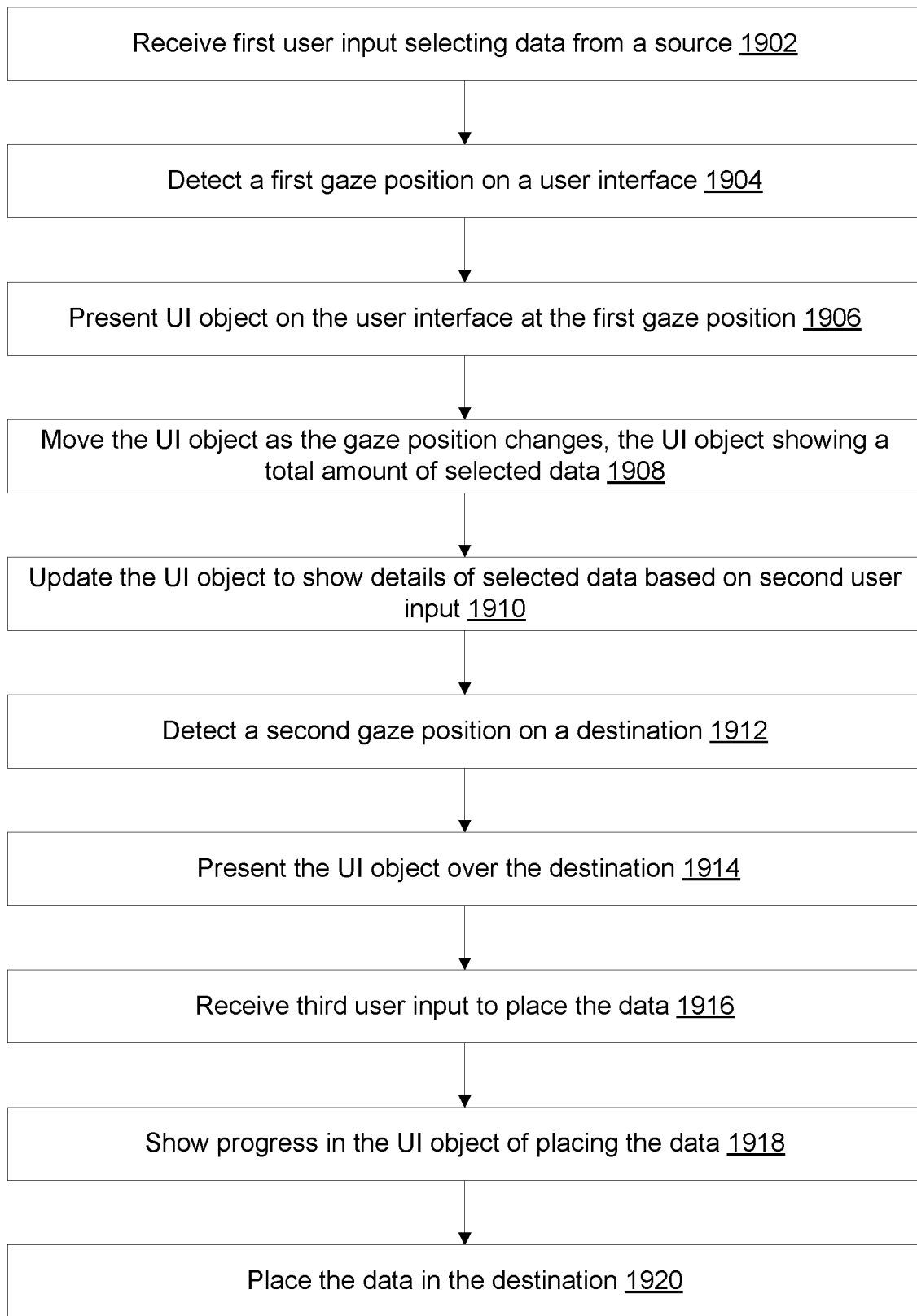
FIG. 19 illustrates an example flow for manipulation data based on a UI object, according to an embodiment.

FIG. 19 illustrates an example flow for manipulation data based on a UI object, according to an embodiment. The flow is described in connection with a computer system. Depending on the use case, the computer system can be a single computing device, where the data is copied from one foreground window and placed in a background window of a user interface of the computing device. In another user case, the computer system can include a plurality of computing devices, where the data is copied from a foreground window of a first computing device and placed in an open window (whether foreground or background) of a second computing device.

The example flow starts at operation 1902, where the computer system receives first user input that selects data from a source. For example, the user input selects a number of files from a source folder.

At operation 1904, the computer system detects a first gaze position on a user interface. At operation 1906, the computer system presents a UI object on the user interface at the first gaze position. The UI object can be invoked based on the selection of the data and/or based on additional user input specific to invoking the UI object.

At operation 1908, the computer system moves the UI object as the gaze position changes. The UI object shows the total amount of selected data (e.g., the total number of selected files). For example, the computer system tracks the gaze position as it moves around the user interface and updates the presentation of the UI object to follow the gaze position. Further, the computer system identifies the selected data and generates a summary thereof (e.g., the total amount of selected data) and presents this summary as content of the UI object.

At operation 1910, the computer system updates the UI object to show details about the selected data based on second user input. For example, the computer system receives the second user input requesting the UI object to be paused and its content to be expanded. The computer system accordingly responds.

At operation 1912, the computer system detects a second gaze position on a destination. For example, based on tracking the gaze position, the computer system determines that now the user is gazing over a location on the destination. The destination can be a background window on the user interface or another open window on a different interface (e.g., when two interfaces are available on two computing devices).

At operation 1914, the computer system presents the UI object over the destination. For example, the computer system updates the presentation of the UI object such that it is shown at the location of the second gaze position.

At operation 1916, the computer system receives third user input to place the data in the destination. Based on the UI object being positioned over the destination (or, equivalently, based on the second gaze position) and in response to the third use input, the computer system initiates the placing of the selected data in the destination. For example, in the context of copying files, the computer system starts pasting the copied files.

At operation 1918, the computer system shows the progress in the UI object of placing the data in the destination. For example, the computer system continuously monitors the amount of the copied data that has been placed in the destination (e.g., the number of the pasted files) and updates the presentation of the UI object to indicate this amount.

At operation 1920, the computer system places the selected data in the destination. This operation can occur in parallel to operation 1918. Upon completion of the data placing, the computer system updates the UI object to indicate the completion and can thereafter, automatically or based on user input, dismiss the UI object.

The disclosure has now been described in detail for the purposes of clarity and understanding. However, it will be appreciated that certain changes and modifications may be practiced within the scope of the appended claims The above description provides exemplary embodiments only, and is not intended to limit the scope, applicability or configuration of the disclosure. Rather, the above description of the exemplary embodiments will provide those skilled in the art with an enabling description for implementing one or more exemplary embodiments. It being understood that various changes may be made in the function and arrangement of elements without departing from the spirit and scope of the disclosure as set forth herein.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the disclosure may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

As used herein, the phrase "a first thing based on a second thing," and the like, may mean that the first thing is based solely on the second thing, or that the first thing is based on the second thing as well as one or more additional things.

What is claimed is:

1. A method for updating a user interface, the method comprising:
    determining, based on an image sensor, a first presence of a first user relative to a computing device;
    determining, by the computing device, an identifier of the first user, the identifier associated with operating the computing device, the operating comprising a presentation of the user interface by the computing device;
    determining, based on the image sensor, a second presence of a second person relative to the computing device;
    causing, by the computing device, an update to the user interface based on the second presence, the user interface being updated from a first state to a second state, wherein, in the second state, the user interface includes a mirror window configured to present image data of the second person, wherein the update is caused based on a determination that the first presence is no longer detected while the second presence remains detected, and wherein the update comprises blurring the user interface from an original state and adding a digital overlay to the blurred user interface;
    detecting, based on the image sensor, a gaze of the second user on the digital overlay; and
    causing a change to the digital overlay, the change reflecting the gaze of the second user.

2. The method of claim 1, wherein the first presence and the second presence are determined as overlapping in time, and wherein the update to the user interface comprises at least one of blurring the user interface, scrambling content of the user interface, or dimming a brightness of a display presenting the user interface.

3. The method of claim 1, wherein the second presence is determined after a determination that the first presence is no longer sensed, and wherein the user interface is updated from a first state to a second state.

4. The method of claim 3, and further comprising:
    determining, based on the image sensor, that the second presence is no longer sensed and that the first presence is sensed again by the gaze tracking system after the second presence is no longer sensed; and
    causing, by the computing device, the user interface to change back from second state to the first state based on the second presence no longer being sensed and the first presence being sensed again.

5. The method of claim 1, wherein the first presence is determined by at least detecting a gaze of the first user on the user interface, and wherein the identifier of the person is determined based on a match between an image of the first user generated based on the image sensor and images of authorized users.

6. The method of claim 1, wherein the first presence is determined based on a first gaze of the first user on the user interface, and wherein the second presence is determined based on a second gaze of the second person on the user interface, and further comprising:
    determining that the update to the user interface should be performed based on a user setting that permits one gaze on the user interface.

7. The method of claim 1, wherein the second presence is determined based on a gaze of the second person on the user interface, and further comprising:
    determining a mismatch between an image of the second person generated based on the image sensor and images of authorized users; and
    determining that the update to the user interface should be performed based on the mismatch.

8. The method of claim 1, wherein the first presence and the second presence are determined as overlapping for a period of time, and further comprising:
    determining, based on the image sensor, that the first presence is no longer sensed after the period of time, wherein the update to the user interface comprises at least one of blurring the user interface or locking the user interface based on the first presence no longer being detected after the period of time.

9. The method of claim 1, wherein the first presence is determined by at least detecting a gaze of the first user prior to determining the second presence of the second person, and further comprising:
    determining, by the computing device, user input about authorizing the second presence while the gaze of the first user is detected; and
    determining, based on the image sensor, that the gaze of the first user is no longer detected while the second presence is still detected, wherein the update to the user interface comprises at least one of blurring the user interface or locking the user interface based on the gaze no longer being detected while the second presence is still detected.

10. The method of claim 1, wherein the user interface is updated from a first state to a second state, and wherein the update is caused based on a determination that the first presence is no longer detected while the second presence remains detected, and wherein the update from the first state to the second state comprises zooming forward a window included in the presentation of the user interface and fading away the window.

11. The method of claim 10, further comprising:
determining, based on the image sensor, that the first presence is detected again after the update from the first state to the second state; and
causing, by the computing device, the user interface to change back to the first state from the second state, wherein the change back comprises zooming back and fading in the window.

12. The method of claim 1, further comprising:
determining, based on the image sensor, that the second presence is no longer sensed; and
causing, by the computing device, the user interface to change back from the second state to the first state based on the second presence no longer being sensed.

13. The method of claim 1, wherein the mirror window presents one of:
a live image of the second person; and
an image of the second person retrieved from memory based on facial recognition.

14. A system comprising:
one or more processors; and
one or more non-transitory computer-readable media storing instructions that, upon execution by the one or more processors, cause the system to:
determine, based on an image sensor associated with the system, a first presence of a first user relative to a computing device;
determine an identifier of the first user, the identifier associated with operating the computing device, the operating comprising a presentation of the user interface by the computing device;
determine, based on the image sensor, a second presence of a second person relative to the computing device;
cause an update to the user interface based on the second presence, the user interface being updated from a first state to a second state, wherein, in the second state, the user interface includes a mirror window configured to present image data of the second person, wherein the update is caused based on a determination that the first presence is no longer detected while the second presence remains detected, and wherein the update comprises blurring the user interface from an original state and adding a digital overlay to the blurred user interface;
detect, based on the image sensor, a gaze of the second user on the digital overlay; and
cause a change to the digital overlay, the change reflecting the gaze of the second user.

15. The system of claim 14, wherein the update to the user interface comprises turning on one or more lights associated with a keyboard of the computing device.

16. The system of claim 15, wherein a distance of the second person to a display presenting the user interface is estimated based on the second presence, wherein the lights are turned on and form a pattern, and wherein the pattern is based on the distance of the second person.

17. The system of claim 14, wherein the update to the user interface comprises presenting an icon on the user interface indicating the second presence of the second person.

18. The system of claim 14, wherein the presentation of the user interface comprises a presentation of first content having a tag and untagged content, and wherein the update to the user interface comprises hiding the first content based on the tag and retaining the presentation of the untagged content.

19. The system of claim 14, wherein the presentation of the user interface comprises a presentation of content, and wherein the execution of the instructions further cause the system to:
detect, based on the image sensor, a gaze of the first user on a portion of the content, wherein the update to the user interface comprises retaining a presentation of the portion of the content and scrambling a presentation of a remaining portion of the content.

20. The system of claim 14, wherein the update to the user interface comprises a change selected from a group consisting of: blurring the user interface, scrambling content of the user interface, adding an icon indicating that the second presence is determined, turning on lights on a keyboard, hide content, and add a window associated with presenting image data of the second person, wherein the change is selected based on a user setting.

* * * * *